United States Patent
Llorens Del Rio et al.

(10) Patent No.: US 12,500,628 B2
(45) Date of Patent: Dec. 16, 2025

(54) SYSTEMS AND METHODS FOR CALIBRATING PHASED ARRAY ANTENNAS

(71) Applicant: VIASAT, INC., Carlsbad, CA (US)

(72) Inventors: Daniel Llorens Del Rio, Lausanne (CH); Manuel Fajardo, Gland (CH); Martin Gimersky, Morges (CH); Alessandro Valentino Matheoud, Saint Sulpice (CH); Alexander Butler, Ulverston (GB)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/767,182

(22) Filed: Jul. 9, 2024

(65) Prior Publication Data

US 2025/0007570 A1   Jan. 2, 2025

Related U.S. Application Data

(63) Continuation of application No. 17/421,142, filed as application No. PCT/US2020/014044 on Jan. 17, 2020, now Pat. No. 12,068,809.

(Continued)

(51) Int. Cl.
  *H04B 7/04* (2017.01)
  *H01Q 3/26* (2006.01)
  (Continued)

(52) U.S. Cl.
  CPC .......... *H04B 7/0408* (2013.01); *H01Q 3/267* (2013.01); *H04B 7/022* (2013.01); *H04B 7/0404* (2013.01); *H04W 36/06* (2013.01)

(58) Field of Classification Search
  CPC ........ H01Q 3/26; H01Q 3/267; H04B 7/0408; H04B 17/12; H04B 17/18; H04B 17/21;
  (Continued)

(56) References Cited

U.S. PATENT DOCUMENTS

| 4,317,120 A | 2/1982 | Bentley et al. |
| 7,239,889 B2 | 7/2007 | Saari et al. |

(Continued)

FOREIGN PATENT DOCUMENTS

| CN | 107682098 | 2/2018 |
| CN | 108923866 | 11/2018 |

OTHER PUBLICATIONS

International Search Report dated Apr. 14, 2020 in corresponding International Application No. PCT/US2020/014044 (14 pages).

(Continued)

*Primary Examiner* — Dac V Ha
(74) *Attorney, Agent, or Firm* — F. CHAU & ASSOCIATES, LLC

(57) ABSTRACT

An antenna system having an antenna array including at least first and second phased array antennas, and a method for field-calibrating the antenna array. Before and after a handover period, communication with respective first and second external satellites or other communication systems is performed using both the first and second antennas. A first beam is formed prior to the handover period. During a first portion of the handover period: a second beam is formed for the communication with the first satellite using the first antenna; the second antenna is deactivated for external communication; and the second antenna is calibrated. During a second portion of the handover period, the second antenna is reactivated for a handed over communication with the second satellite by forming a third beam using the second antenna, while the first antenna maintains its communication with the first satellite via the second beam.

20 Claims, 21 Drawing Sheets

Related U.S. Application Data

(60) Provisional application No. 62/794,478, filed on Jan. 18, 2019.

(51) Int. Cl.
*H04B 7/022* (2017.01)
*H04B 7/0404* (2017.01)
*H04B 7/0408* (2017.01)
*H04W 36/06* (2009.01)

(58) Field of Classification Search
CPC .... H04B 17/382; H04B 7/022; H04B 7/0404; H04W 36/06; H04W 52/40
See application file for complete search history.

(56) References Cited

U.S. PATENT DOCUMENTS

| | | | |
|---|---|---|---|
| 7,392,015 | B1 | 6/2008 | Farlow et al. |
| 9,363,712 | B2 | 6/2016 | Chuberre et al. |
| 9,705,611 | B1 | 7/2017 | West |
| 10,164,334 | B2 * | 12/2018 | Kareisto ............... G01S 7/40 |
| 2003/0125044 | A1 | 7/2003 | Deloach et al. |
| 2010/0079347 | A1 | 4/2010 | Hayes et al. |
| 2013/0217343 | A1 * | 8/2013 | Tenbroek ............ H04B 17/14 455/77 |
| 2014/0354507 | A1 * | 12/2014 | Maca .................... H01Q 3/26 343/853 |
| 2016/0197660 | A1 | 7/2016 | O'Keeffe et al. |
| 2017/0041830 | A1 | 2/2017 | Davis et al. |
| 2018/0006712 | A1 | 1/2018 | Hreha et al. |
| 2018/0159219 | A1 | 6/2018 | Vehovc et al. |
| 2018/0316092 | A1 | 11/2018 | Cai et al. |
| 2018/0337723 | A1 | 11/2018 | Arnaud et al. |
| 2022/0006536 | A1 * | 1/2022 | Feng .................... H04B 17/14 |
| 2022/0149900 | A1 | 5/2022 | Llorens Del Rio et al. |

OTHER PUBLICATIONS

Agrawal, et al., "A Calibration Technique for Active Phased Array Antennas", IEEE International Symposium on Phased Array Systems and Technology, Oct. 14-17, 2003, Boston, MA, pp. 223-228.

Fulton, et al., "Calibration Techniques for Digital Phase Arrays", 2009 IEEE International Conference on Microwaves, Communications, Antennas and Electronics Systems, Nov. 9-11, 2009, Tel Aviv, Israel, pp. 1-10.

Kim, et al., "Online Calibration for LTE-Based Antenna Array System", International Journal of Antennas and Propagation, vol. 2016, Article ID 2645870, 10 pages.

Mailloux, "Array Failure Correction with a Digitally Beamformed Array", IEEE Transactions On Antennas and Proppagation, vol. 44, No. 12, Dec. 1996, pp. 1543-1550.

Sorace, "Phased Array Calibration", IEEE Transactions On Antennas and Propagation, vol. 49, No. 4, Apr. 2001, pp. 517-525.

Bazzi, et al., "Blind On Board Wideband Antenna RF Calibration for Multi-Antenna Satellites", IEEE, ICASSP2017, 2017, pp. 6294-6298.

* cited by examiner

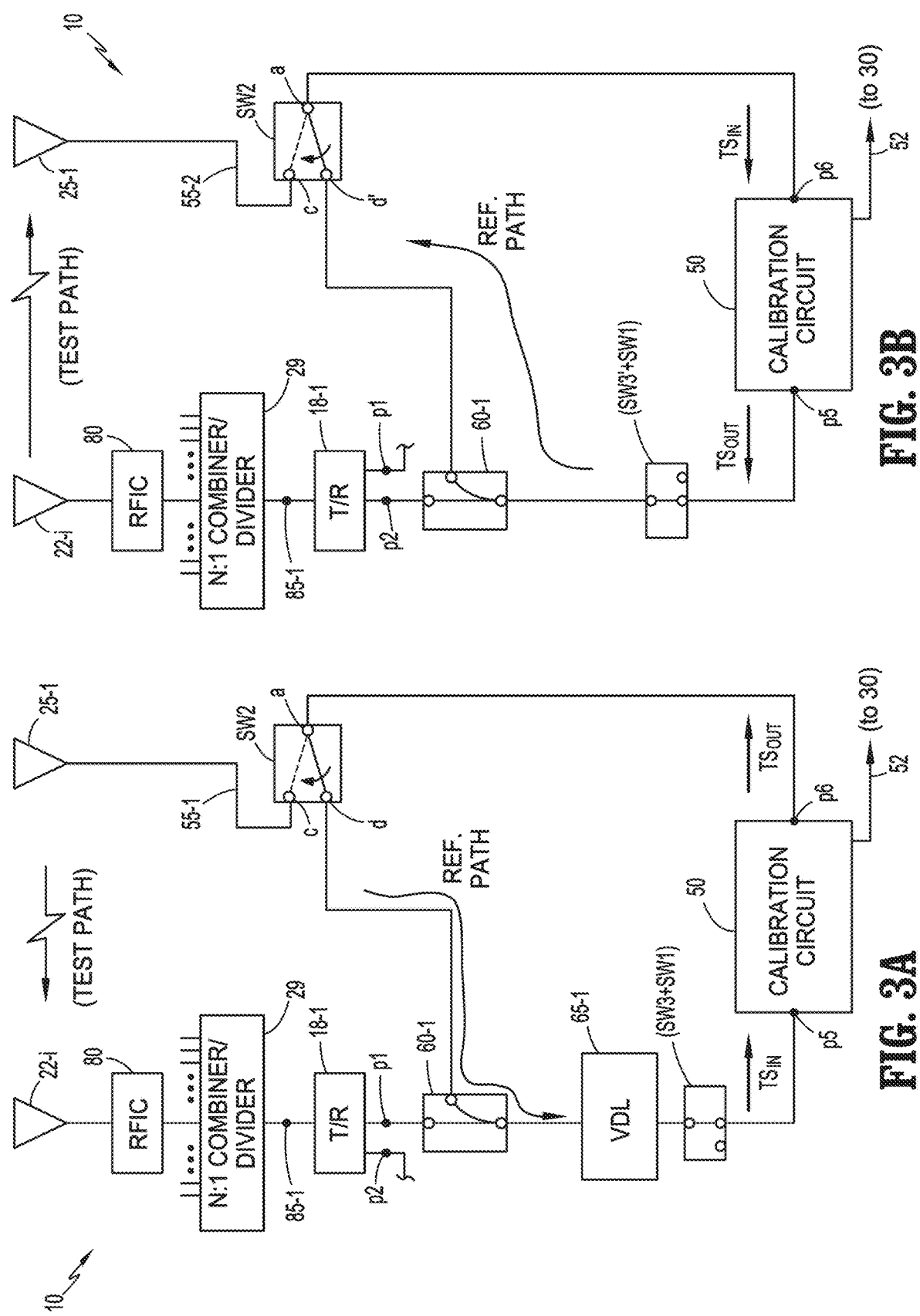

SYSTEMS AND METHODS FOR CALIBRATING PHASED ARRAY ANTENNAS

CROSS REFERENCE TO RELATED APPLICATIONS

This application is a continuation of U.S. patent application Ser. No. 17/421,142, filed on Jul. 7, 2021 in the U.S. Patent and Trademark Office, which is a 371 national stage entry of PCT application No. PCT/US2020/014044, filed Jan. 17, 2020, which claims priority to U.S. Provisional Application No. 62/794,478 filed in the U.S. Patent and Trademark Office on Jan. 18, 2019, the entire contents of which are incorporated herein by reference.

TECHNICAL FIELD

This disclosure relates generally to phased array antennas and more particularly to a phased array based antenna system with field-calibration capability.

DISCUSSION OF RELATED ART

A phased array antenna may include hundreds or thousands of antenna elements, each connected to a respective signal path carrying a transmitting direction signal ("transmit signal") signal and/or a receiving direction signal ("receive signal"). In the front ends of some "active" phased arrays, hundreds or thousands of low noise amplifiers (LNAs) and/or power amplifiers (PAS), variable phase shifters and other integrated circuit components are distributed across the antenna array in the signal paths for amplifying and phase shifting a transmit signal/receive signal routed through one or more of the antenna elements. To form accurate beams, the phase and amplitude (gain/loss) relationships between the signal paths often need to be precisely set during the antenna system manufacture and set-up. It is desirable to maintain such phase and amplitude relationships during the antenna operation in the field to ensure the antenna continues to meet any requisite performance requirements such as beam pointing accuracy and sidelobe levels.

Over time, however, degradation of LNAs, PAs and other signal path components is inevitable. Thus, antenna systems may include a built-in calibration circuit for periodically calibrating the signal paths in the field by adjusting phase shifts of the phase shifters and gains/losses of the amplifiers (and variable attenuators, if included). One type of calibration circuit only operates during predetermined maintenance periods in which the antenna system is deactivated for wireless communication with satellites or other external systems. Another type of calibration circuit enables calibration to be carried out simultaneously with such communication, but current circuits of this type are known to be highly complex.

SUMMARY

In aspects of the present disclosure, an antenna system with a phased array is configured with control and calibration circuitry for performing a field-calibration of signal paths to antenna elements of the phased array during handover periods. As compared to current systems capable of "any time calibration", the control and calibration circuitry disclosed herein may be less complex, yet achieve the same overall objectives.

An aspect of the presently disclosed technology involves a method of calibrating an antenna system including an antenna array of at least first and second antennas. Prior to a handover period in which communication with the antenna system is handed over from a first communication system to a second communication system, a first beam is formed for the communication with the first communication system through the first and second antennas. During a first portion of the handover period: a second beam is formed for the communication with the first communication system using the first antenna; the second antenna is deactivated for external communication; and the second antenna is calibrated. During a second portion of the handover period, the second antenna is reactivated for a handed over communication with the second communication system by forming a third beam using the second antenna, while the first antenna maintains its communication with the first communication system via the second beam. After the handover period, a fourth beam is formed for the communication with the second communication system through both the first and second antennas.

In another aspect, an antenna system includes an antenna array including first and second antennas; a calibration circuit; a cross-coupled switch coupled to the first and second antennas; and a controller. The controller is configured to control the first and second antennas, the calibration circuit, and the cross-coupled switch to perform operations of the method outlined above.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label directly with a second label or with a dash and second label that distinguishes among the same/similar elements (e.g., −1, −2). However, if a given description uses only the first reference label, it is applicable to any one of the same/similar elements having the same first reference label irrespective of the second reference label. In the drawings:

FIG. 3A illustrates example receive path calibration loops and calibration circuitry in the antenna system.

FIG. 3B illustrates example transmit path calibration loops and calibration circuitry in the antenna system.

DETAILED DESCRIPTION OF EMBODIMENTS

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

Herein, the terms "receive" and "transmit", when used as adjectives, mean "receiving direction" and "transmitting direction", respectfully. For example, a "receive signal" is a signal propagating in the receiving direction of an antenna. Similarly, the phrase "on receive" means "during a receiving operation" and "on transmit" means "during a transmitting operation" or the like. A "beam signal" refers to a signal representing combined signal energy received from or provided to a plurality of antenna elements that collectively form an antenna beam. An "element signal" refers to a signal provided by a single antenna element on receive, or fed to a single element signal on transmit to be radiated.

Figure 1A:
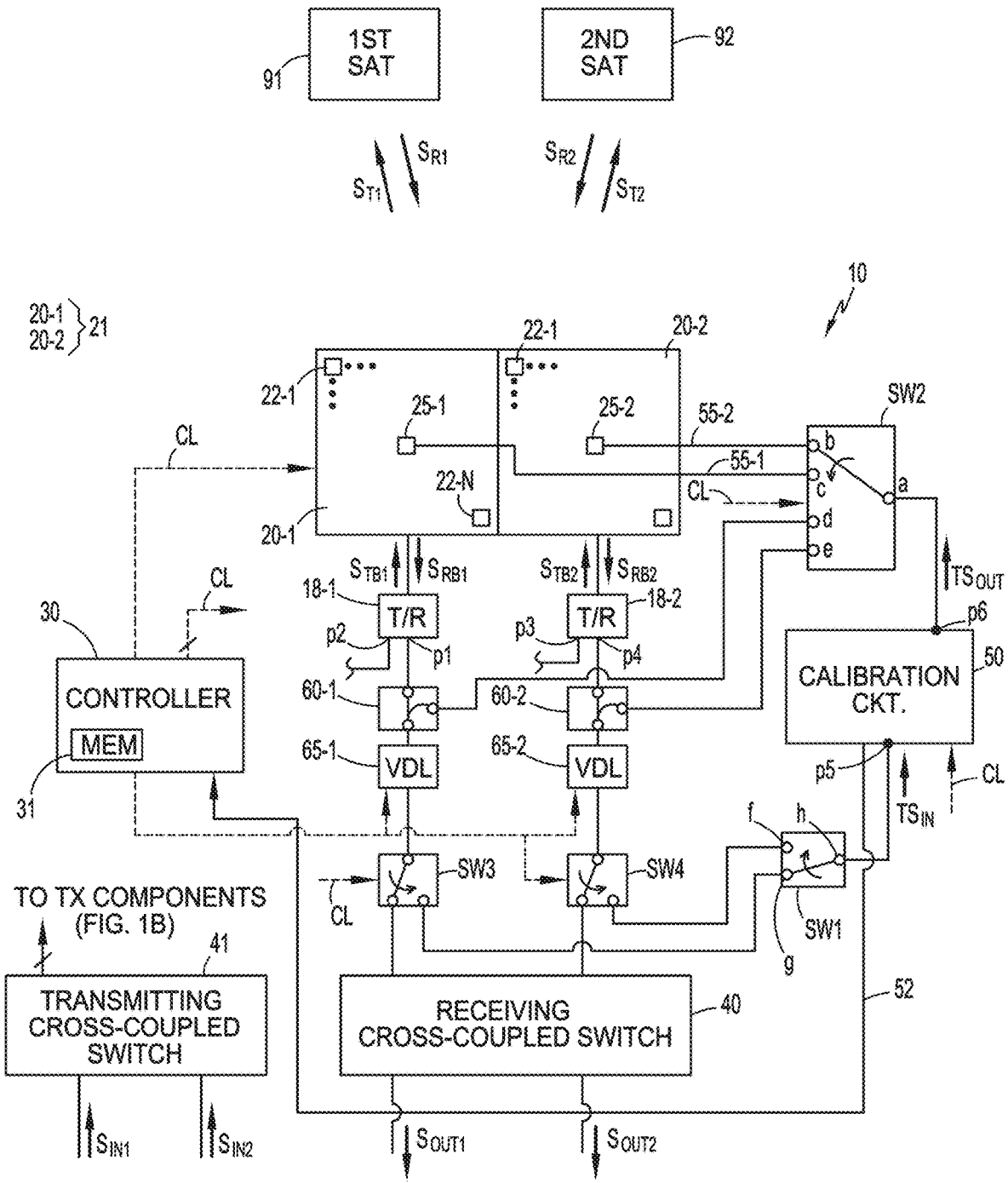
FIG. 1A schematically illustrates example circuitry of an antenna system according to an embodiment of the present technology.

FIG. 1A schematically illustrates example circuitry of an antenna system 10 in accordance with an embodiment of the present technology. Antenna system 10 includes an antenna array 21, a controller 30, a receiving cross-coupled switch (RCC) 40, a transmitting cross-coupled (TCC) switch 41, transmit/receive (T/R) elements 18-1 and 18-2, variable delay lines (VDLs) 65-1 and 65-2, a calibration circuit 50, directional couplers 60-1 and 60-2, single pole multi-throw (SPMT) switches SW1 and SW2 (discussed further below), and single pole, two throw (SPDT) switches SW3 and SW4. Antenna array 21 includes a first antenna 20-1 and a second antenna 20-2, each of which may be an active phased array antenna with distributed amplifiers and phase shifters behind each antenna element 22 or behind small groups of antenna elements 22. In various examples, antenna system 10 may be an antenna system at a fixed ground location; aboard a ground-based mobile vehicle or ship; or aboard an aircraft, spacecraft or satellite.

Herein, a "communication" between two entities will refer to a bi-directional communication of RF signals (data traffic and/or control signals) between the entities, using any suitable protocol. An external communication system, such as first satellite 91 or second satellite 92, communicates with antenna system 10. In other examples, the external communication system is a ground-based communication system or an aircraft-based or spacecraft-based communication system. In the following description, communication with a satellite will be described as an example.

Hereafter, a "normal communication operation" involving antenna system 10 will refer to a communication between antenna system 10 and a single satellite by means of antenna system 10 forming a pencil beam using first and second antennas 20-1 and 20-2. A normal communication operation is distinguishable from a communication during a handover period, during which a communication session with antenna system 10 is handed over from first satellite 91 to second satellite 92. For example, when antenna system 10 is coupled to end user equipment on one side of the communication session with first satellite 91, a successful handover of the communication session to second satellite 92 dispenses with the need for the end user equipment to re-initiate the communication session by attempting to locate a suitable satellite through antenna system 10. For instance, during a handover involving a voice call or a live video stream, an end user may not perceive a reduction in quality during the handover period. A handover handled by antenna system 10 may be referred to as a "make-before-break" handover from a first satellite to a second satellite. In such a make-before-break handover, the first and second satellites may share information about a current communication session with antenna system 10. During a short handover period, e.g., about 30 seconds of less, both the first and second satellites may communicate the same information signals such as video or audio data, redundantly, to antenna system 10, albeit using different frequencies, pseudo-random codes, modulations, or other ways to differentiate their signals. This method is sometimes referred to as "soft handover". Alternatively, the second satellite communicates just control bits, but not information signals during the handover period, and immediately after the handover period, precisely transmits information signals of the communication session intended to directly follow the information signals exchanged by the first satellite (sometimes referred to as "hard handover"). The control bits are used to manage a subsequent communication of information signals, and may convey control information such as frequencies, timing, protocol, modulation, packet structure, etc. to be used for the communication. In either case of soft or hard handover for the make-before-break handover, any discernible discontinuity in the communication session may be avoided after communication with the first satellite is dropped to complete the handover. As will be explained further below, throughout a handover period, antenna system 10 communicates with first satellite 91 using only one of the first and second antennas 20-1 and 20-2, and communicates with second satellite 92 using only the other one of antennas 20-1 and 20-2.

Controller 30 may control overall operations of antenna system 10 by sending control signals over control lines CL to each of antennas 20-1, 20-2, calibration circuit 50, RCC and TCC switches 40, 41, switches SW1-SW4, variable delay lines 65, and in some cases, to T/R elements. The control signals output by controller 30 may: control switching states of switches within RCC and TCC switches 40, 41; control biasing and ON/OFF states of amplifiers within each of antennas 20-1 and 20-2; control phase shifts of phase shifters within each of antennas 20-1, 20-2 for beam steering, set variable delay paths within VDLs 65-1 and 65-2 for phase alignment between antennas 20-1 and 20-2; and control calibration operations via control of calibration circuit 50 and switches SW1-SW4. For instance, during normal communication operations, controller 30 outputs control signals to cause first and second antennas 20-1, 20-2 to be coupled together and collectively form a beam for communication with only one of the satellites 91, 92. During a first portion of a handover period, controller 30 may output control signals to cause only antenna 20-1 to communicate with satellite 91 by deactivating antenna 20-2 for any external communication, while other control signals initiate a calibration operation of antenna 20-2 via control of calibration circuit 50. (For the calibration, controller 30 includes a memory 31 that may store phase and amplitude reference data and correction data, discussed later.) During a second portion of a handover period, or in a different handover period, controller 30 may initiate calibration of antenna 20-1 in an analogous manner. It is noted here that the calibration of first and second antennas 20-1, 20-2 includes a calibration of the VDLs 65-1, 65-2, which may be interchangeably referred to as "true time delay units" (TTDUs). VDLs 65-1, 65-2 each include a plurality of selectable delay line sections with different lengths, and hence different insertion phases. A plurality of switches in each VDL 65 are controllable by controller 30 to select one or more of the delay lines for the signal path and thereby set a desired insertion phase through the respective VDL 65. In this manner, a targeted phase relationship (typically equal insertion phases, i.e., phase alignment) between the two halves of the antenna system 10 may be achieved. In an alternative embodiment, one of VDLs 65 may be substituted with a fixed delay line and the phase relationship between the two halves is set by adjusting the other VDL 65. In still other embodiments, other types of time shifters are substituted for the VDLs 65. In another embodiment (discussed below in connection with FIG. 2C), a plurality of internal VDLs 65 are provided within each antenna 20-1, 20-2, and their delays are individually controlled by controller 30.

It is noted here that controller 30 may output control signals on control lines CL to calibration circuit 30 to deactivate it for calibration operations during all periods of communication between antenna system 10 and any external communication system except for handover periods.

With the methods detailed below, calibration of antennas 20-1 and 20-2 is avoided during normal communication operations but is performed during handover periods. With this scheme, antenna system 10 may be equipped with simpler calibration circuitry to implement the calibration as would otherwise be available in conventional antenna systems configured for "any-time" on-field calibration, while achieving similar objectives. For instance, requisite tolerances in phase and amplitude alignment of signal paths throughout a certain time period of field operations with uninterrupted communications may be met by antenna system 10, but conventional systems may only meet such tolerances with significantly more complex calibration circuitry.

Referring still to FIG. 1A, first and second antennas 20-1, 20-2 may each be a planar phased array with N antenna elements 22-1 to 22-N, although the number of elements may differ between the two antennas in other examples. First and second antennas 20-1, 20-2 may each have a respective calibration element 25-1, 25-2 located within their boundaries, typically in a central position as illustrated. Calibration elements 25-1, 25-2 are each selectively connected to calibration circuit 50 through switch SW2, and may be radiating elements similar to antenna elements 22. In other embodiments, only a single calibration element 25 is used for both antennas 20-1, 20-2 and is mounted near the edge of one of the antennas 20 adjacent the other antenna 20. In still other examples, each antenna 20-1, 20-2 includes multiple calibration elements 25, with each calibration element 25 allocated for calibration of a group of M antenna elements surrounding that calibration element within the respective antenna, where M<N.

During a normal communication operation with first satellite 91, in the receive direction, a receive signal $S_{R1}$ is received by each antenna 20-1 and 20-2, which respectively derive and output "receive beam signals" $S_{RB1}$ and $S_{RB2}$ from the receive signal $S_{R1}$. During a normal communication, "transmit beam signals" $S_{TB1}$ and $S_{TB2}$ (provided from transmitting cross-coupled switch 41) are routed through T/R elements 18-1 and 18-2 to antennas 20-1 and 20-2, respectively. Transmit/Receive (T/R) elements are elements for separating transmit signals from receive signals so as to permit both transmit and receive signals to share the same antennas and other circuit components/signal paths (e.g., the paths of a combiner/divider network within each antenna 20-1, 20-2). For example, T/R elements 18-1 and 18-2 may be T/R switches in the case of half-duplex communication, or diplexers in the case of full duplex communication with different frequency channels on transmit vs. receive. (Additional T/R elements may be included within each antenna 20-1, 20-2, discussed below.) It is noted here that in other embodiments in which the antenna elements 22 are not shared between transmit and receive operations, T/R elements 18 can be omitted. Transmit signals $S_{TB1}$ and $S_{TB2}$ may be routed from ports p2 and p3 of T/R elements 18-1 and 18-2 to antenna array 21. Concurrently or alternatingly, receive signals $S_{RB1}$, $S_{RB2}$ may be routed from antenna array 21 to ports p1 and p4, respectively, of T/R elements 18-1, 18-2. During a normal communication, receive signals $S_{RB1}$ and $S_{RB2}$ are further routed through couplers 60-1, 60-2; VDLs 65-1, 65-2; and switches SW3, SW4, respectively, to RCC switch 40. RCC switch 40 cross-couples these signals to thereby output substantially equal amplitude output signals $S_{OUT1}$ and $S_{OUT2}$. Output signals $S_{OUT1}$ and $S_{OUT2}$ are routed to one or more demodulators, discussed later, depending on the state of antenna system 10. It is noted here that in an alternative embodiment discussed later in connection with FIG. 8, SPDT switches SW3 and SW4 are omitted, and inputs to SPMT switch SW1 originate from couplers within RCC switch 40 and TCC switch 41. In this case, calibration paths on receive include paths within RCC switch 40.

In the transmit direction, only one of the signals $S_{IN1}$ or $S_{IN2}$ may be input during a normal communication in which only one of transmit signals $S_{T1}$ and $S_{T2}$ is transmitted to first satellite 91 or second satellite 92. In this case, transmit beam signals $S_{TB1}$ and $S_{TB2}$ are derived from the inputted one of the signals $S_{IN1}$ and $S_{IN2}$. Both signals $S_{IN1}$ and $S_{IN2}$ may be input during a portion of a handover period in which signals $S_{T1}$ and $S_{T2}$ are transmitted simultaneously to first and second satellites 91 and 92, respectively.

During the normal communication operation with first satellite 91, antenna system 10 may not process any signals transmitted from second satellite 92, and vice versa during normal communication with second satellite 92. For instance, first satellite 91 may transmit/receive over a first frequency channel(s) while second satellite 92 transmits/receives over a second frequency channel(s) that differs from the first frequency channel, and antenna system 10 may filter out signals outside the first frequency channel when communicating normally with first satellite 91. In the same manner as that described above for the normal communication with first satellite 91, antenna system 10 may, in a post-handover period, communicate normally with second satellite 92 by receiving/transmitting signals $S_{R2}/S_{T2}$ transmitted from/to second satellite 92 using both antennas 20-1 and 20-2, and not process signals from/to first satellite 91. In this post-handover period, one of signals $S_{IN1}$, $S_{IN2}$, derived from a single modulator, may be inputted to antenna system 10; and both signals $S_{OUT1}$ and $S_{OUT2}$ are outputted from antenna system 10 in an analogous manner as described above.

During the handover period, a coupled path output terminal of one or both couplers 60-1, 60-2 is selectively connected to calibration circuit 50 through switch SW2, but the coupled signal through the coupled paths may not be used during normal communication operation. Briefly, in a receive path calibration according to an embodiment, one of 2N possible receive paths at a time is calibrated, and a plurality of such receive paths are calibrated sequentially. At any given time, a receive signal path is calibrated from a selected one of the antenna elements 22-$i$ (i=any one of 1 to N) to a reference point. In one example, if sufficient time is available during the handover period, all of N receive paths from antenna 20-2 to the reference point may be calibrated in one portion of the handover period. If further sufficient time is available, some or all of N receive paths from antenna 20-1 may be calibrated. An example calibration operation will be described below.

Figure 1B:
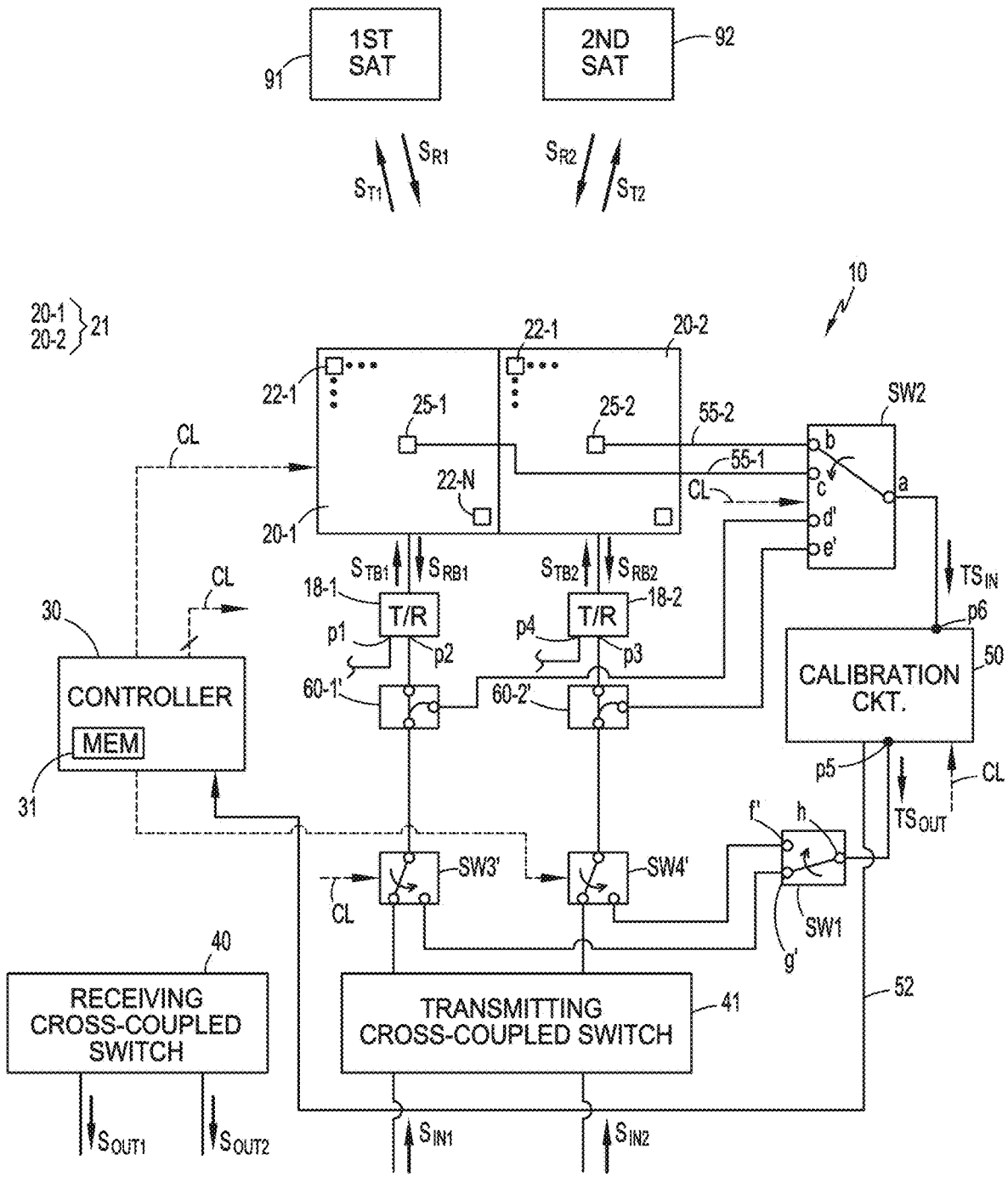
FIG. 1B schematically illustrates additional example circuitry of the antenna system of FIG. 1A.

FIG. 1B schematically illustrates additional example circuitry and connection paths of antenna system 10. In particular, example circuit elements coupled between transmitting cross-coupled (TCC) switch 41, antenna array 21 and calibration circuit 50 are depicted. A first transmit signal path between TTC switch 41 and first antenna 20-1 includes a series connection of a SPDT switch SW3', a coupler 60-1', and T/R element 18-1 (note that transmit signal $S_{TB1}$ is applied to port p2). A second transmit signal path between TTC switch 41 and second antenna 20-2 includes a series connection of a SPDT switch SW4', a coupler 60-2', and T/R element 18-2 (where transmit signal $S_{TB2}$ is applied to port p3). Thus, in this example, the transmit signal paths between TTC switch 41 and antenna array 21 omit VDLs. In alternative configurations, one or more VDLs are included. It is noted here that SPMT switch SW1 has an input port h and four output ports f, g (seen in FIG. 1A), f' and g', and SPMT switch SW2 has an input port a and six output ports b, c, d, e (FIG. 1A), d' and e'. During calibration, transmit calibration paths differ from the receive calibration paths of FIG. 1A by selective routing through ports d' and e' of switch SW2 and ports f' and g' of switch SW1, as illustrated in FIG. 1B. In an alternative configuration to that shown in FIG. 1B, if it is desired to include transmit paths within TCC switch 41 in calibration measurements, SPDT switches SW3' and SW4' may be omitted, and transmit path calibration inputs to SPMT switch SW1 may originate from couplers within TCC switch 41.

Figure 1C:
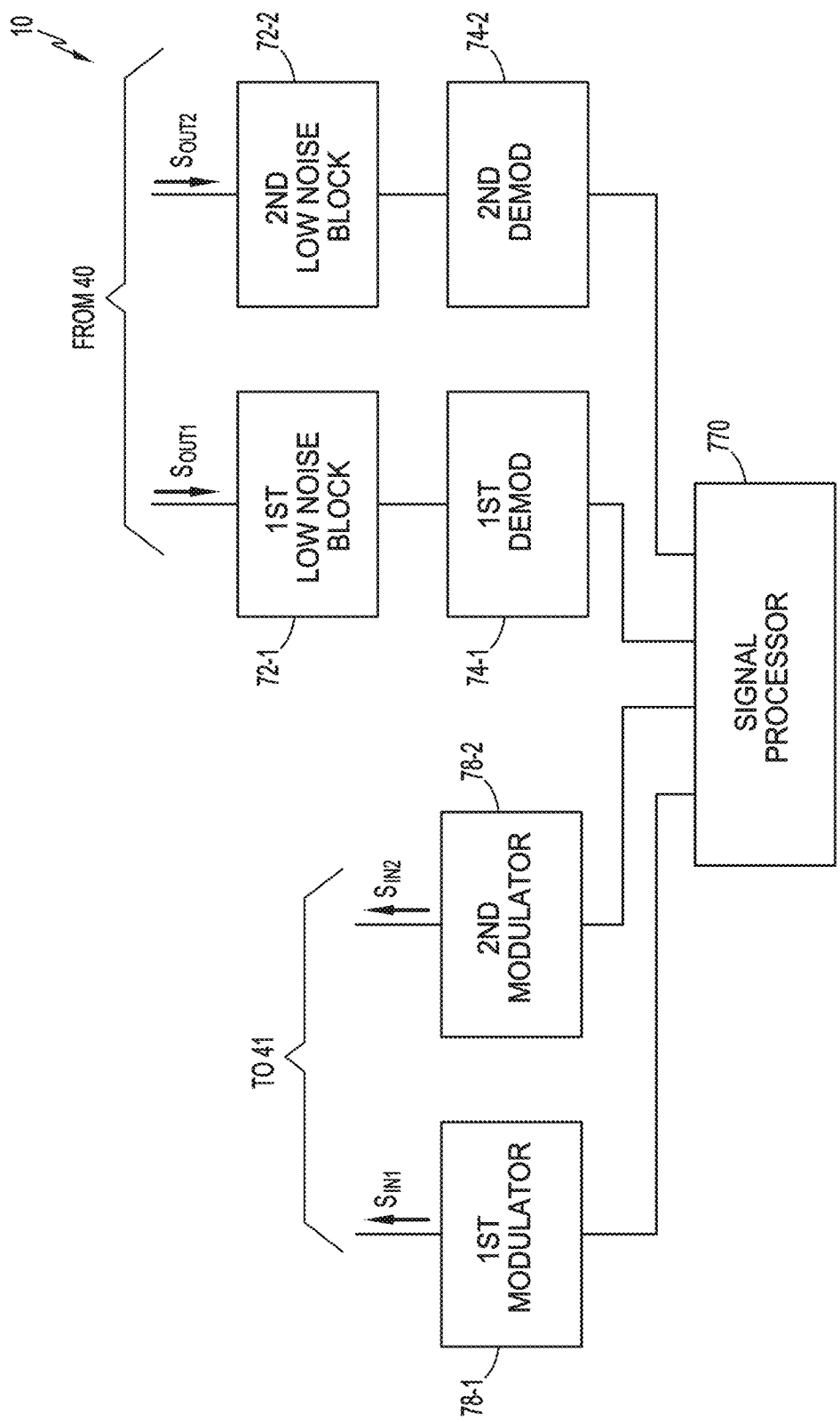
FIG. 1C schematically illustrates additional example transmit and receive circuitry of the antenna system of FIG. 1A.

FIG. 1C schematically illustrates example additional transmit and receive circuitry of the antenna system of FIG. 1A. Antenna system 10 may further include first and second low noise blocks (LNBs) 72-1, 72-2, first and second demodulators 74-1, 74-2, first and second modulators 78-1, 78-2, and a signal processor 770. First and second low noise blocks 72-1 and 72-2 each provide additional low noise amplification of receive signals. During a portion of the handover period in which the cross-coupling of RCC switch 40 is intentionally broken (discussed later in connection with FIGS. 7A to 7G), first and second demodulators 74-1 and 74-2 receive and demodulate signals $S_{OUT1}$ and $S_{OUT2}$, respectively. The demodulated outputs are provided to signal processor 770 for further processing. For instance, signal processor 770 may be connected to an I/O interface (not shown) and may output end-user data, e.g., audio/video data derived from the demodulated signals. During a soft handover as mentioned above, signal processor 770 may recover redundant information signals from signals $S_{OUT1}$ and $S_{OUT2}$ that originated from receive signals $S_{R1}$, $S_{R2}$ from the different satellites 91 and 92. Signal processor 770 may output a single audio/video output data stream to the I/O interface based on the redundant information signals.

First and second modulators 78-1 and 78-2 receive input signals to be modulated from signal processor 770. For instance, only one of the modulators 78-1 and 78-2 may be selected as a single modulator to output modulated signals which modulate a data stream received from signal processor 770. During normal communication, the modulated signal is split by TCC switch 41 to generate transmission signal $S_{T1}$ or $S_{T2}$ to satellite 91 or 92, respectively, via antenna array 21. During a portion of a handover period in which the cross-coupling of TCC switch 41 is broken, both first and second modulators 78-1 and 78-2 individually modulate signals for transmission to first satellite 91 and second satellite 92, respectively, in an analogous manner to the handover operations described herein for the receiving direction.

Figure 2A:
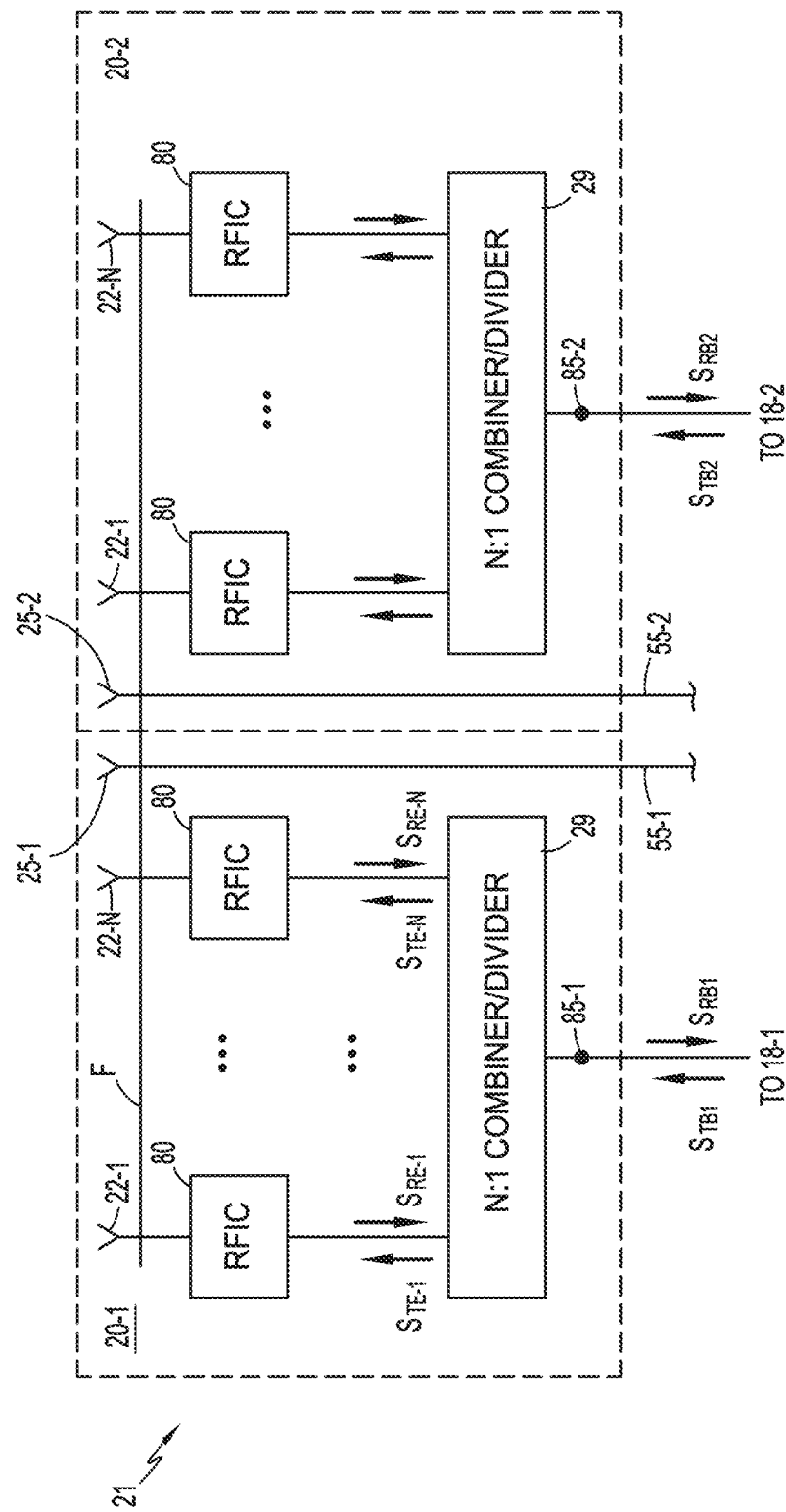
FIG. 2A schematically depicts an exemplary antenna array of the antenna system.

FIG. 2A schematically depicts an exemplary antenna array 21 of antenna system 10. Antenna array 21 may include side by side antennas 20-1 and 20-2, each of which may be phased arrays including a plurality N of antenna elements 22-1 to 22-N conformally arranged with respect to a common surface F, e.g., a top surface of a dielectric substrate. Each of antenna elements 22 may be a printed patch antenna on surface F. Alternatively, antenna elements 22 are dipoles, monopoles or other antenna types uniformly spaced from surface F. In any case, one or more calibration elements 25 may be similarly mounted or printed within the aperture perimeter of each antenna 20-1, 20-2. A convenient location for a calibration element 25 is a central location with respect to the group of antenna elements 22 designated to be calibrated by through use of that calibration element 25. Each calibration element 25 is a radiating element that may be directly connected to calibration circuit 50 via a respective signal line 55-1 or 55-2 and a switching path within switch SW2. Each antenna 20-1 and 20-2 may further include an N:1 combiner/divider 29 and N RF Integrated Circuits (RFICs) 80 respectively connected between the N antenna elements 22-1 to 22-N and the N:1 combiner/divider 29. Each of the antenna elements 22 may be used for both transmit and receive operations. In other embodiments, the antenna elements 22 are not shared for transmit and receive operations. Instead, a plurality K<N of the antenna elements 22 in each antenna 20 are dedicated for transmitting signals from antenna system 10, and a remaining plurality P=N−1 antenna elements are dedicated for receiving signals transmitted from satellites to antenna system 10. The K elements may be interspersed with the P antenna elements such that each of the K and P antenna elements may be defined by a common form factor and have the same effective aperture. Alternatively, a subarray of K transmitting antenna elements 22 may reside adjacent to a subarray of P receiving antenna elements 22. In any of the above schemes, each antenna 20 may employ a single combiner/divider network 29 for both combining all of the receive signals into a combined receive beam signal and dividing an input transmit beam signal into N or K divided transmit signals that are output to N or K antenna elements 22, as the case may be. In another example, a separate divider network is used for the transmit signals.

In the following discussion, it will be assumed for simplicity of explanation that each of the antenna elements 22 is used for both transmit and receive operations. To this end, on transmit, N:1 combiner/divider 29 of antenna 20-1, when operating as a divider, divides a "transmit beam signal" $S_{TB1}$ received at a port 85-1 of antenna 20-1 into N "transmit element signals" $S_{TE-1}$ to $S_{TE-N}$. The latter signals are respectively adjusted by RFICs 80 and radiated by antenna elements 22-1 to 22-N of antenna 20-1 to form at least part of a transmit antenna beam generated by antenna array 21. Likewise, an input transmit beam signal $S_{TB2}$ at port 85-2 of antenna 20-2 is divided and transmitted by antenna 20-2 through its antenna elements 22. In the receive direction, signals received by antenna elements 22-1 to 22-N of antenna 20-1 are adjusted by respective RFICs 80 to generate "receive element signals" $S_{RE-1}$ to $S_{RE-N}$ that are applied to N respective input ports of N:1 combiner/divider 29 operating as a combiner. These signals are combined to generate receive beam signal $S_{RB1}$. Similar operations are performed by antenna 20-2 to generate receive beam signal $S_{RB2}$.

Figure 2B:
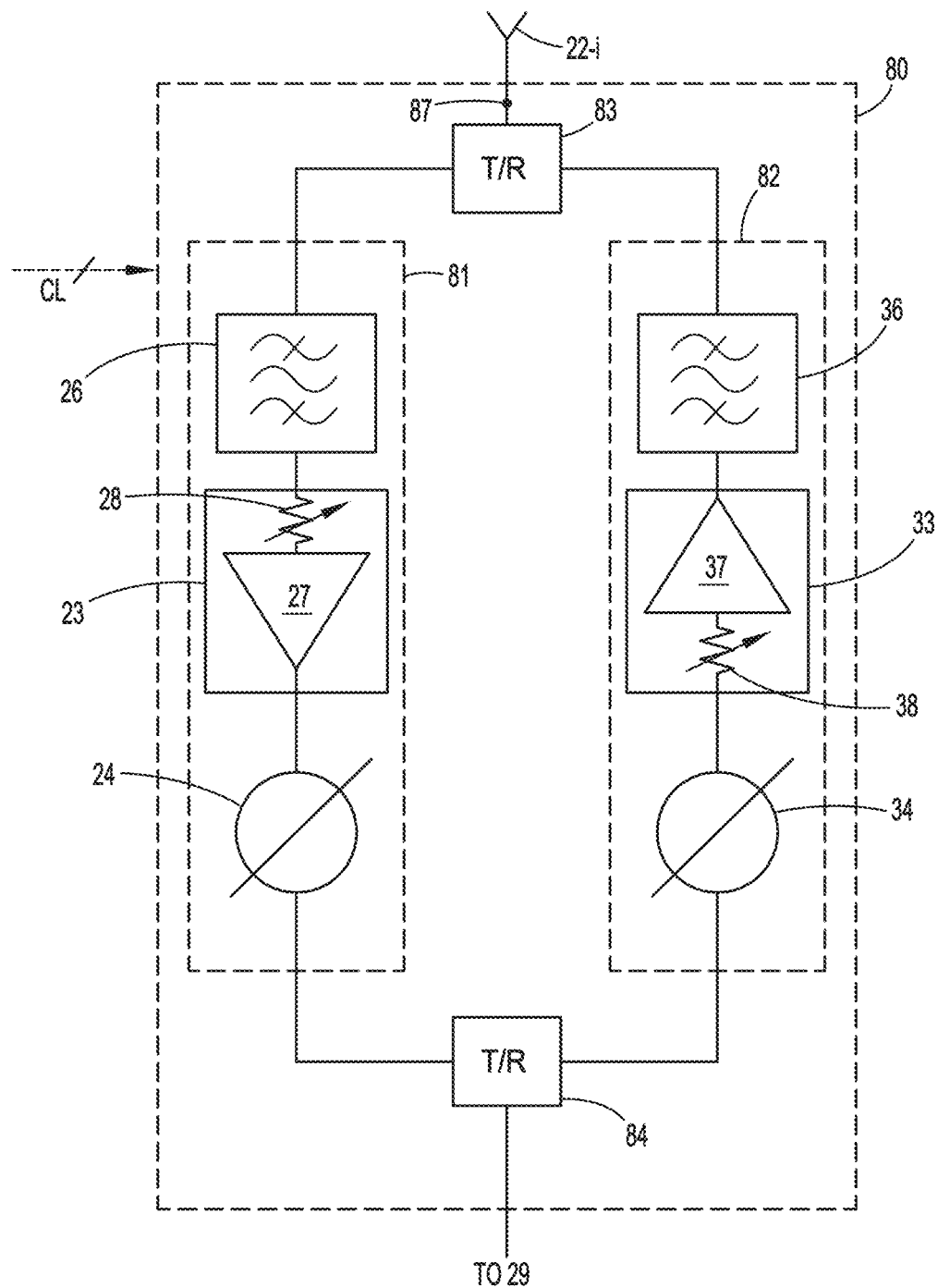
FIG. 2B shows example transmit and receive path circuitry within an RFIC connected to an antenna element of the antenna array of FIG. 2A.

FIG. 2B shows an example configuration of an RFIC 80 for transmitting/receiving signals to/from any given antenna element 22-i. RFIC 80 may include receive circuitry ("receive chain") 81 and transmit circuitry ("transmit chain") 82, each connected between T/R elements 83 and 84, which may be T/R switches or diplexers. T/R element 83 has an input port at node 87 connected to antenna element 22-i, a first output port connected to one end of receive chain 81 and a second output port connected to one end of transmit chain 82. The other ends of receive chain 81 and transmit chain 82 are connected to respective first and second output ports of T/R element 84, where an input port of T/R element 84 connects to one of the N output ports of N:1 combiner/divider 29. If T/R elements 83 and 84 are T/R switches, they may provide separate routes for transmit and receive signals during different time slots in a half-duplex operation. If different frequency channels are used on transmit and receive, T/R elements may be diplexers and prevent the transmit signals from interfering with the receive chain 81 by removing unwanted frequencies, and vice versa.

Receive chain 81 may include a series connection of an amplitude adjuster 23, a phase shifter 24 and a bandpass filter (BPF) 26. The order of the shown series connection may differ in other examples. Each amplitude adjuster 23 may be comprised of just a low noise amplifier (LNA) 27, or an LNA 27 in series with a variable attenuator 28. Transmit chain 82 may include a series connection of a phase shifter 34, a BPF 36 and an amplitude adjuster 33, where the latter may be comprised of just a power amplifier (PA) 37 or a PA 37 in series with a variable attenuator 38. Each of amplitude adjusters 23, 33, phase shifters 24, 34 and BPFs 26 within antenna array 21 may be individually controlled by a respective or grouped control signal generated by controller 30 and sent over a respective control line CL or a shared control line CL. A control signal sent to a phase shifter 24 or 34 sets the insertion phase of that phase shifter. A first control signal sent to an amplitude adjuster 23 or 33 may control a bias voltage for the LNA 27 or PA 37 therein and thereby control its gain, or the first control signal may carry the bias voltage itself. A first control signal to an LNA or PA within amplitude adjuster 23 or 33 may also set an ON-OFF state of that LNA of PA. A second control signal output to a variable attenuator 28 or 38 within amplitude adjuster 23 or 33 sets the variable attenuator's insertion loss. A control signal output to a BPF 26 or 36 may set a passband for that BPF.

For antenna array 21 to form a desired antenna beam in the transmit direction, the amplitudes and phases of transmit signals at feed points 87 of each antenna element 22 may generally need to be within a certain range of predetermined values. Thus, for each antenna 20-1, 20-2, the insertion phase and insertion loss (the latter often called path gain or forward voltage gain S21) of the signal paths between the port 85 (or other reference point within antenna system 10) and a feed point 87 of each antenna element 22 should be within predefined tolerances of values determined when antenna system 10 was set-up during manufacture. Such tolerances should be met for the vast majority of the signal paths to generate a transmit antenna beam with requisite characteristics, e.g., beam pointing accuracy, beamwidth, antenna gain, sidelobes, etc. The same holds true for the receive paths. During the manufacturing process, a calibration procedure to ensure that such tolerances are met for a super majority of the signal paths (e.g., over 90% or over 95%) may have been performed using calibration circuit 50 and calibration elements 25. Once antenna system 10 has been field-operated, however, the signal path characteristics may have changed due to a variety of factors, and calibration circuit 50 may be used to periodically re-calibrate the signal paths.

Figure 2C:
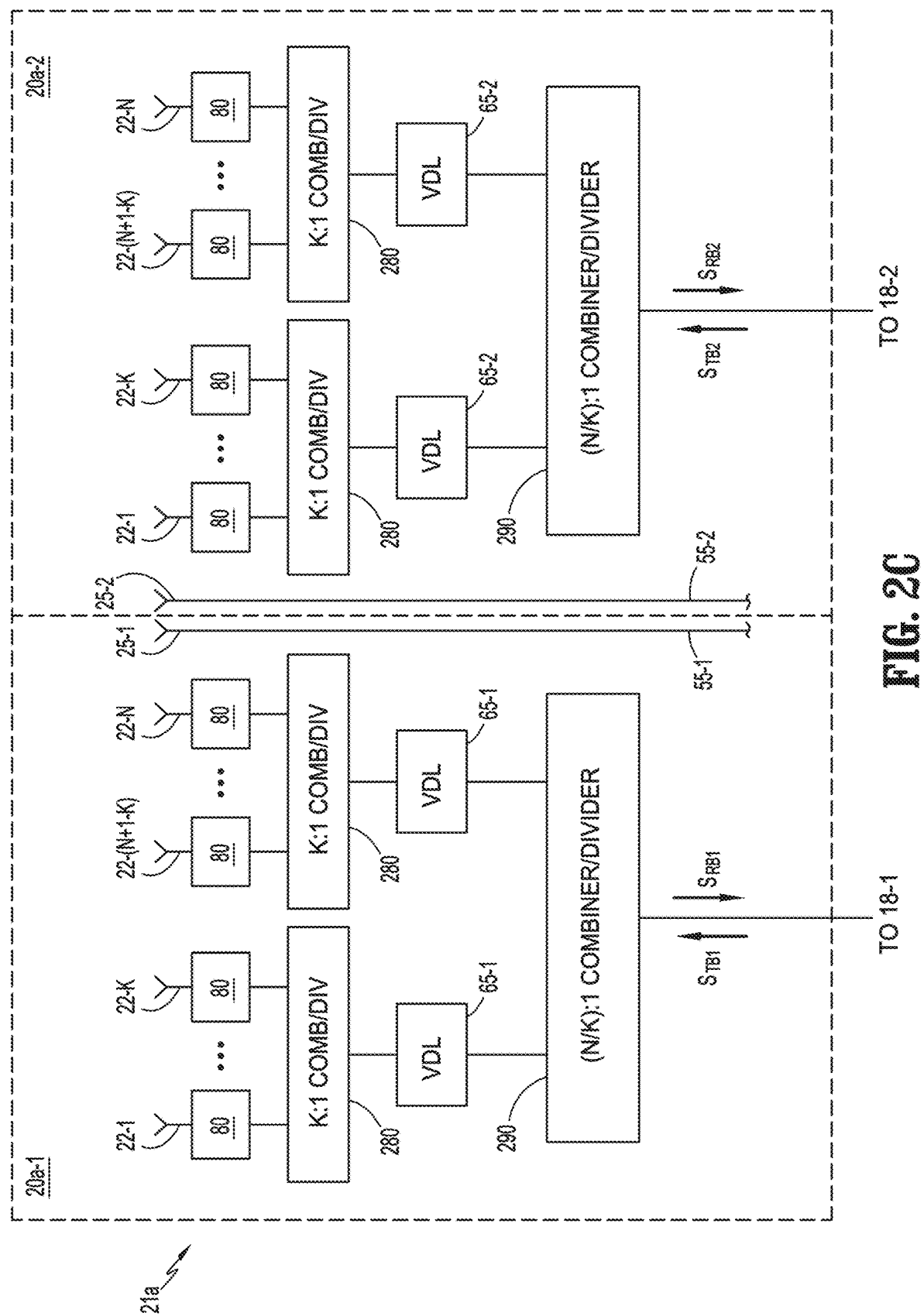
FIG. 2C schematically illustrates an alternative configuration for an antenna array that may be used in the antenna system.

FIG. 2C schematically illustrates an alternative configuration for the antenna array 21 of antenna system 10. Antenna array 21a includes first antenna 20a-1 and second antenna 20a-2, each including a plurality of variable delay lines (VDLs), each for providing selectable variable delays, controlled by controller 30, to groups of antenna elements 22 within each antenna. Thus, instead of including a single N:1 combiner/divider, each antenna 20a includes a plurality (N/K) VDLs 65-1 or 65-2, coupled between a plurality of K:1 combiner/dividers 280 and an (N/K):1 combiner/divider. Accordingly, signal paths associated with (N/K) groups of K antenna elements 22 may each be effectively phase shifted by a respective VDL 65-1 or 65-2 as part of a calibration procedure. For example, signals paths associated with a first group of K antenna elements 22-1 to 22-K are delayed by a first VDL 65-1 controlled to have a first delay whereas signal paths associated with a second group of K antenna elements 22-(N+1−K) to 22-N are delayed by a different VDL 65-1 controlled to have a second delay.

FIG. 3A illustrates example receive path calibration loops and calibration circuitry in antenna system 10. FIG. 3B illustrates example transmit path calibration loops and calibration circuitry in antenna system 10. For example, referring collectively to FIGS. 1A-3B, in accordance with embodiments herein, during a portion of a handover period, antenna 20-2 communicates with a satellite while a calibration operation is performed on antenna 20-1. As shown in FIG. 3A, to field-calibrate receive paths between individual antenna elements 22 of antenna 20-1 and reference point 85-1, a reference path measurement may first be taken. Receive path measurements may thereafter be made with respect to the reference path measurement. In the reference path measurement, all the LNAs 27 of antenna 20-1 are first turned OFF to limit noise in the measurement. Switch SW2 is controlled to connect input port "a" with output port d, where port d connects to a coupling port of coupler 60-1. A test signal $TS_{OUT}$ is then routed through a series path comprising switch SW2, coupler 60-1, VDL 65-1, switch SW3 (with its switch path controlled to close towards switch SW1), and switch SW1 (with its switch path closed between input port h and output port g as seen in FIG. 1A). Thus, a return signal $TS_{IN}$ at port p5 of calibration circuit 50 represents the fed back portion of test signal $TS_{out}$ in the reference path. Calibration circuit 50 may then measure the relative amplitude and phase of $TS_{IN}$ VS. $TS_{OUT}$ to arrive at a reference path measurement (e.g. insertion loss and insertion phase for the reference path). Measurements of receive paths including antenna elements 22 may then be initiated.

For instance, to measure a receive path between antenna element 22-1 and reference point 85-1 (under the assumption that the paths within T/R element 18-1 and coupler 60-1 remain constant throughout the measurement), the LNA 27 connected to antenna element 22-1 may be switched ON while the remaining LNAs of antenna 20-1 remain OFF. Concurrently, a control signal may set the switching path of switch SW2 to signal line 55-1 (path a-c is closed), while calibration circuit 50 outputs the same test signal $TS_{OUT}$. Note that the frequency of test signal $TS_{OUT}$ may differ from the frequency or frequencies used for the current normal communication between antenna 20-2 and the satellite. Test signal $TS_{OUT}$ is routed to calibration element 25-1, which radiates the same. The radiated signal is captured by antenna element 22-1 of antenna 20-1 and routed through the receive path of RFIC 80 connected to antenna element 22-1, and then through N:1 combiner/divider 29 of antenna 20-1 and the remaining receive path chain to port p5 of calibration circuit 50, i.e., T/R element 18-1, coupler 60-1, VDL 65-1 and switches SW3 and SW1. Thus, the near field signal $TS_{OUT}$ received by antenna element 22-1 is fed back to calibration circuit 50 through switch SW1 as another instance of input signal $TS_{IN}$. Calibration circuit 50 may then again measure the relative amplitudes and phases of $TS_{IN}$ VS. $TS_{OUT}$ to arrive at a test path measurement, and compare the test path measurement to the reference path measurement to arrive at a final receive path measurement.

Calibration circuit 50 may then report the measurement result to controller 30 on a data line 52. Controller 30 may then compare the measurement result to an expected result, e.g., a result of the same measurement taken during manufacturing set up of antenna system 10 and stored in memory 31. In some examples, controller 30 or a controller of calibration circuit 50 just compares relative phases and relative amplitudes of the measured results to one another, e.g., by using one of the results as a reference and comparing the other results to the reference. In either case, if the comparison indicates that amplitude and/or phase of the overall signal path has changed beyond a threshold, or is different from that of the reference result by more than a threshold, controller 30 may implement an adjustment. The adjustment may involve adjusting a phase offset of phase shifter 24 and/or the gain of LNA 26 and/or the loss of attenuator 28 within the receive path 80 connected to the antenna element 22-*i* that was just measured. After the adjustment, the calibration test may be repeated to ensure that the adjustment was successful. This process may then be sequentially repeated for the remaining antenna elements (22-2 through 22-N if antenna element 22-1 was measured first) if time permits during the handover period. In another portion of the handover period, or in a next handover period, an analogous calibration process may be performed to calibrate the receive paths of antenna 20-2 while antenna 20-1 communicates with a satellite.

It is noted here that a phase alignment between first antenna 20-1 and second antenna 20-2 may be implemented by first comparing the reference path measurements in the calibrations of the two antennas to each other, and then reporting the results to controller 30. Controller 30 can then make a delay adjustment in one or both of the VDLs 65-1, 65-2 to align the phases of the receive paths leading to the two antennas 20-1, 20-2. A delay adjustment to one or more VDLs 65 in the configuration of FIG. 2C may also be made after measurements are made in signal paths connected to different VDLs 65. In another example sequence, VDLs 65 in any of the above configurations may be calibrated prior to a calibration of the phase shifters and/or amplifiers in the RFICs 80.

FIG. 3B illustrates that an analogous calibration procedure may be performed to calibrate transmit paths within each antenna 20-1 and 20-2. In a transmit path calibration for antenna 20-1, for instance, all the power amplifiers 37 of antenna 20-1 may be initially turned OFF so that antenna 20-1 is deactivated for communication with any satellite. A reference path measurement may be made by outputting a test signal $TS_{OUT}$ from port p5 of calibration circuit 50 while the signal paths of switches SW1 and SW3' are controlled to route signal $TS_{OUT}$ to coupler 60-1', and the signal path of switch SW2 is connected from port a to port d'. This allows the test signal $TS_{OUT}$ to propagate through back to port p6 of calibration circuit 50 as a return signal $TS_{IN}$. Signals $TS_{IN}$ and $TS_{OUT}$ are then compared to obtain a reference path "S21" S-parameter measurement (insertion loss and phase) measurement. Transmit path measurements to the antenna elements 22 may then be initiated by turning on one PA 37 at a time. To measure a transmit path to antenna element 22-1, for example, test signal $TS_{OUT}$ is routed to antenna element 22-1 through the transmit path chain from port p5 through the connected RFIC 80. Antenna element 22-1 radiates the test signal, which is received by calibration element 25-1 and routed back to calibration circuit 50 as a return signal $TS_{IN}$. $TS_{IN}$ is then compared to $TS_{OUT}$ in an analogous manner as was done for the reference path measurement to arrive at a test path measurement, which is compared to the reference path measurement to arrive at a transmit path measurement. The measurement result may be sent to controller 30, which may then make analogous adjustments to amplitude and phase of the transmit path elements as was done for the receive path case, thereby completing the transmit path calibration. The process may then be repeated for antenna elements 22-2 to 22-N. Although no VDL is shown in FIG. 3B, it is understood that time shifting (provided by means of VDLs) may be used on transmit in addition to phase shifting (provided by means of RFIC phase shifters 34.

Figure 4A:
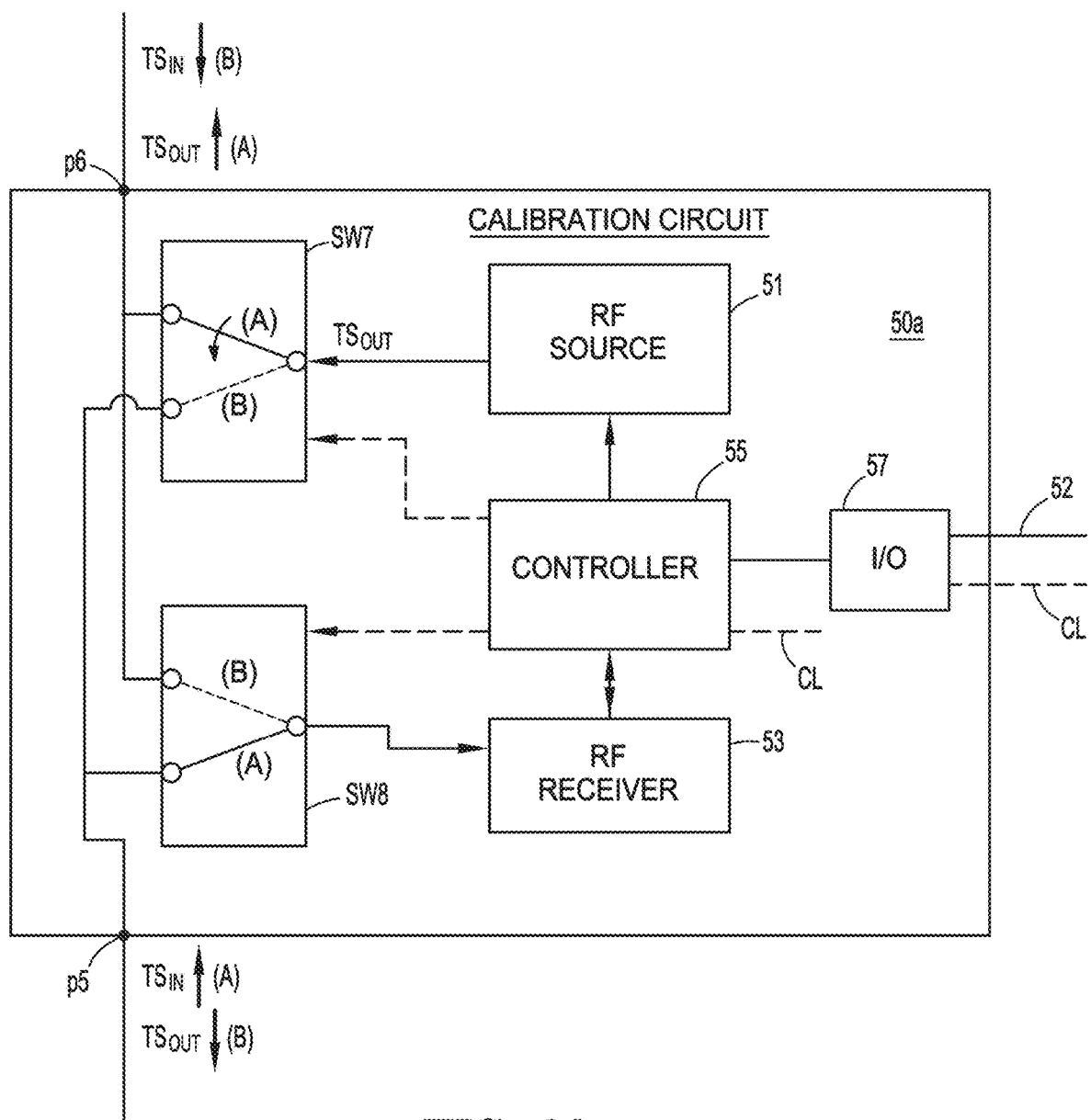
FIG. 4A is a block diagram of an exemplary calibration circuit within the antenna system.

FIG. 4A is a block diagram of a calibration circuit 50a, which is an example of calibration circuit 50 of antenna system 10. Calibration circuit 50a includes SPDT switches SW7 and SW8, an RF source 51, a controller 55, an RF receiver 53 and an I/O interface 57. During a receive path calibration measurement as described above, RF source 51 generates test signal $TS_{OUT}$ while switch SW7 is controlled by controller 55 (which in turn receives commands from controller 30 for the calibration procedure) to set its switching state to position "A", thereby routing signal $TS_{OUT}$ to port p6. Switch SW8 is likewise controlled to its position "A" to receive the return signal $TS_{IN}$ at port p5 and route it to receiver 53. Controller 55 and receiver 53 may together or individually perform the comparisons noted above between signals $TS_{OUT}$ and $TS_{IN}$ and between the reference path and test path signals and send the measurement results to controller 30 on data line 52 through I/O interface 57. During a transmit path calibration measurement as described above, the same or similar operations are performed with the switch positions of switches SW7 and SW8 each switched to position "B". In this manner, the test signal $TS_{OUT}$ is routed to port p5 while the return signal $TS_{IN}$ is received at port p6.

Figure 4B:
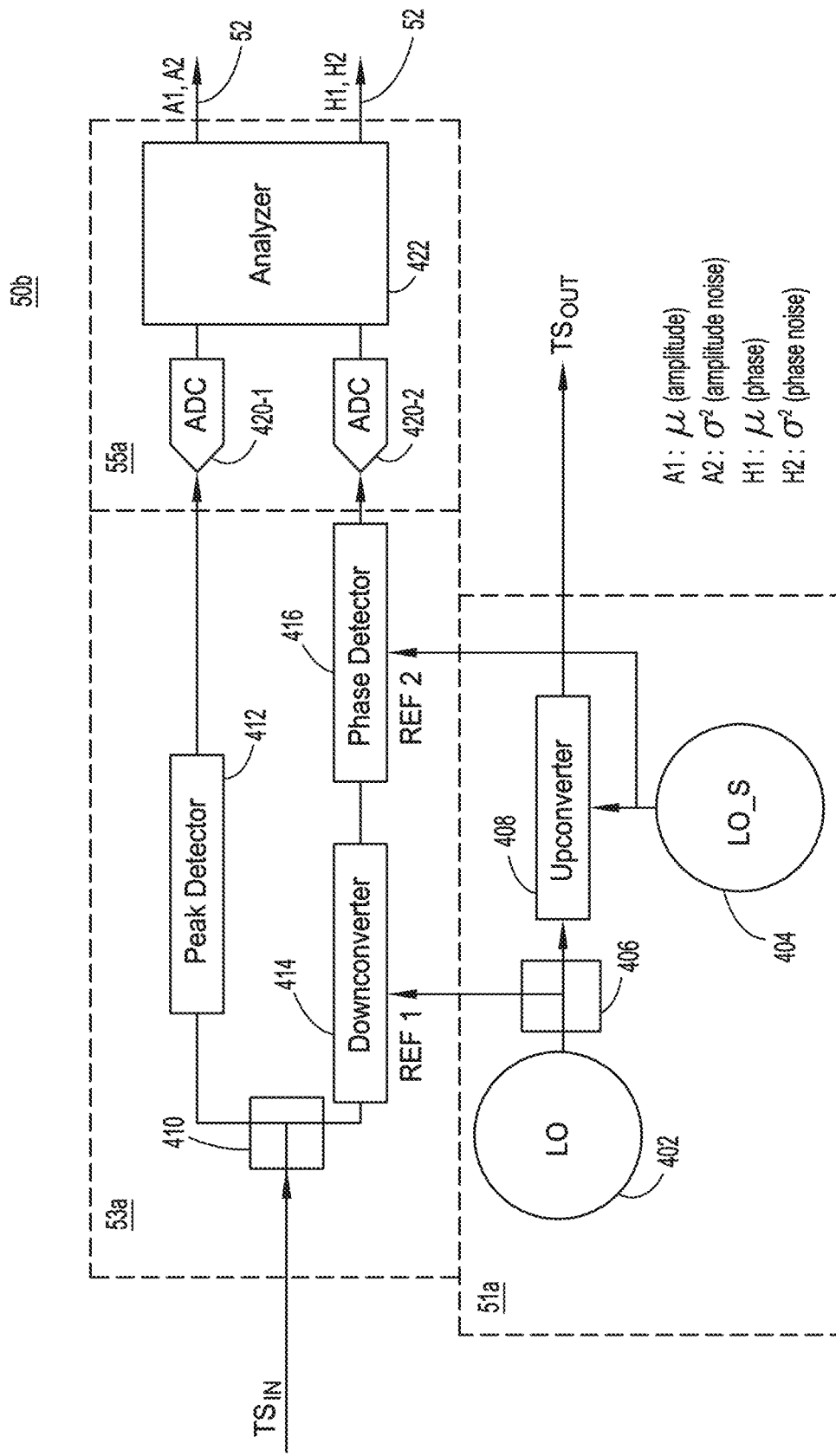
FIG. 4B schematically illustrates another example of a calibration circuit within the antenna system.

FIG. 4B schematically illustrates another example of a calibration circuit within the antenna system. An advantage of this architecture is that it may reduce or minimize low frequency noise. Calibration circuit 50b includes an RF source 51a, an RF receiver 53a and a controller 55a, and may further include switches SW7, SW8 and an I/O interface 57 (both not shown in FIG. 4B) controlled in the same manner described above. RF source 51 includes a first local oscillator (LO) 402, an RF power divider 406, an upconverter 408 and a second local oscillator 404. In an example, second LO 404 is a lower noise generating LO than first LO 402. Receiver 53a includes an RF power divider 410, a peak detector 412, a downconverter 414 and a phase detector 416. Controller 55a includes first and second analog to digital converters (ADCs) 420-1, 420-2 and a digital signal analyzer 422.

To implement a receive path or a transmit path calibration measurement, first LO 402 generates a relatively low frequency RF signal, which is split by divider 406 into first and second divided LO signals. The first divided LO signal is upconverted by upconverter 408 using a second LO signal generated by second LO 404, and the upconverted signal is output as test signal TSOUT. The return signal TSIN is divided by divider 410 into a first divided return signal which is applied to peak detector 412, and a second divided return signal applied to downconverter 414. Peak detector 412 detects peak amplitudes of signal the first divided return signal and outputs an envelope signal to ADC 420-1, which generates digital samples of the envelope signal. The digital samples are analyzed by analyzer 422, which generates therefrom first and second amplitude result signals A1, A2. Result signal A1 represents a mean μ of the samples whereas result signal A2 represents a standard deviation $\partial^2$ of the samples, which is indicative of amplitude noise. Result signals A1 and A2 are output to controller 30 over a data line 52. Controller 30 uses the result signals to make a determination on adjusting amplitude in the associated receive or transmit paths that were measured.

Downconverter 414 receives and downconverts the second divided return signal using a first reference signal REF1, which is the first divided LO signal output from divider 406. The downconverted output signal of downconverter 414 is applied to phase detector 416 which detects the signal's phase using a second reference signal REF2 (the second LO signal). Phase detector 416 outputs a phase signal indicative of the detected phase, and the phase signal is digitized by ADC 420-2 to provide a stream of phase samples. The phase samples are analyzed by analyzer 422, which generates therefrom a first phase result signal representing a mean u of the phase samples and a second phase result signal H2 representing a standard deviation (SD) $\partial^2$ of the phase samples. These result signals H1, H2 are likewise output to controller 30 over a data line 52. Controller 30 uses the result signals to make a determination for adjusting phase in the associated receive or transmit paths that were measured.

Figure 4C:
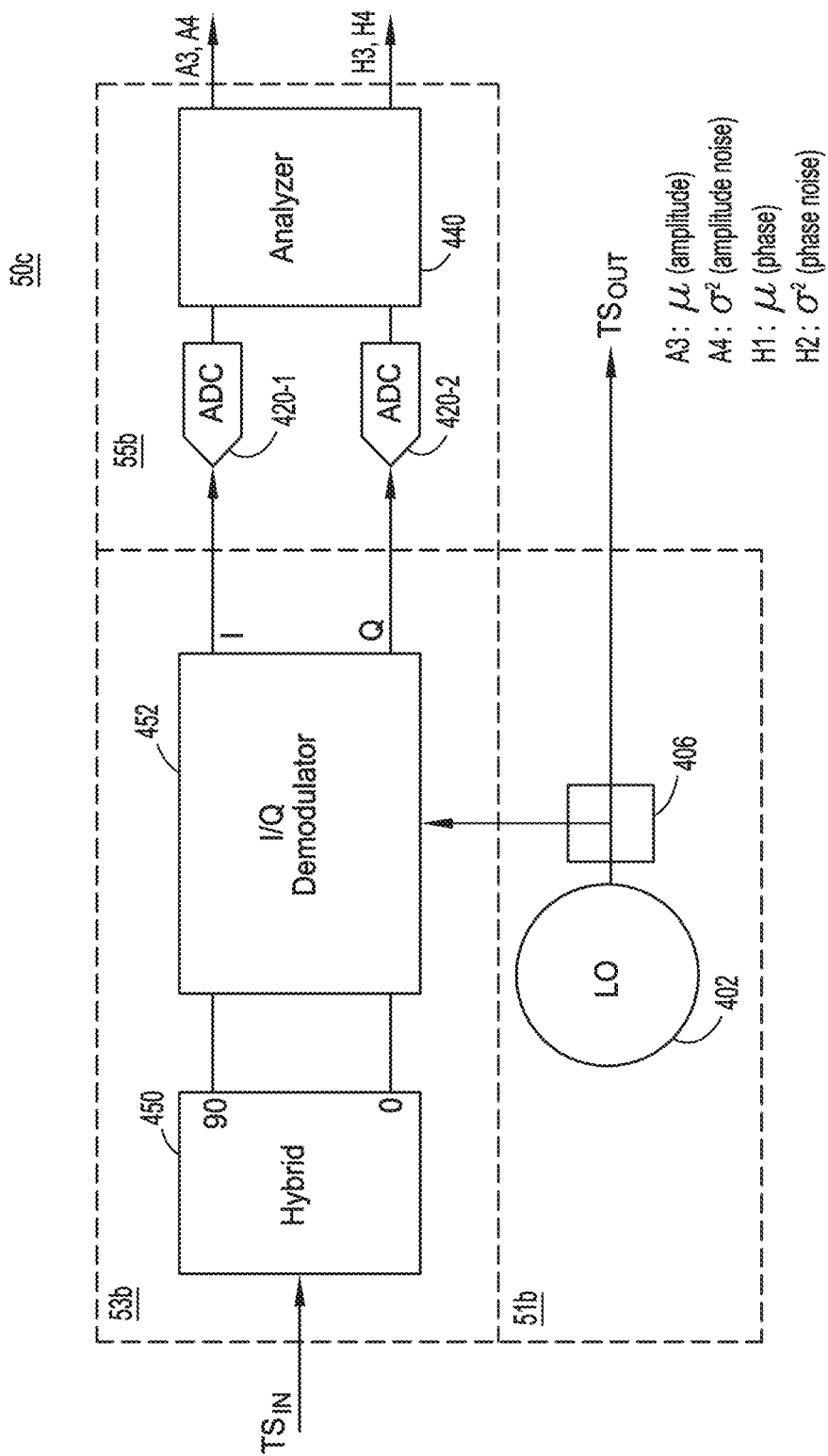
FIG. 4C schematically illustrates a further example of a calibration circuit within the antenna system.

FIG. 4C schematically illustrates a further example of a calibration circuit within the antenna system. An advantage of this architecture is that it may reduce or minimize both cost and space occupation. Calibration circuit 50c includes a controller 55b, an RF source 51b and an RF receiver 53b. Controller 55b includes first and second ADCs 420-1, 420-2 and an analyzer 440. RF source 51b includes a single LO 402 and a divider 406 that divides an LO signal from LO 402 into a first divided output signal as test signal $TS_{OUT}$, and a second divided LO signal. Receiver 53b includes a hybrid coupler 450 and an In-phase/Quadrature phase (I/Q) demodulator 452. Hybrid coupler 450 divides the return signal $TS_{IN}$ into first and second output signals offset in phase from each other by 90°. I/Q demodulator demodulates these output signals into I and Q output signals. ADC 420-1 samples the I signal while ADC 420-2 samples Q signal. Analyzer 440 analyzes the I and Q samples to generate therefrom third and fourth amplitude result signals A3, A4 representing mean and SD, respectively, of the insertion loss (S21 amplitude) in the measured path. Analyzer 440 further analyzes the I and Q samples to generate therefrom phase result signals H3, H4 representing mean and SD, respectively, of the insertion phase in the measured path. These result signals A3, A4, H3, H4 are output to controller 30 over data lines 52. Controller 30 uses the result signals to make determinations for adjusting amplitude and phase in the associated receive or transmit paths that were measured.

Figure 5A:
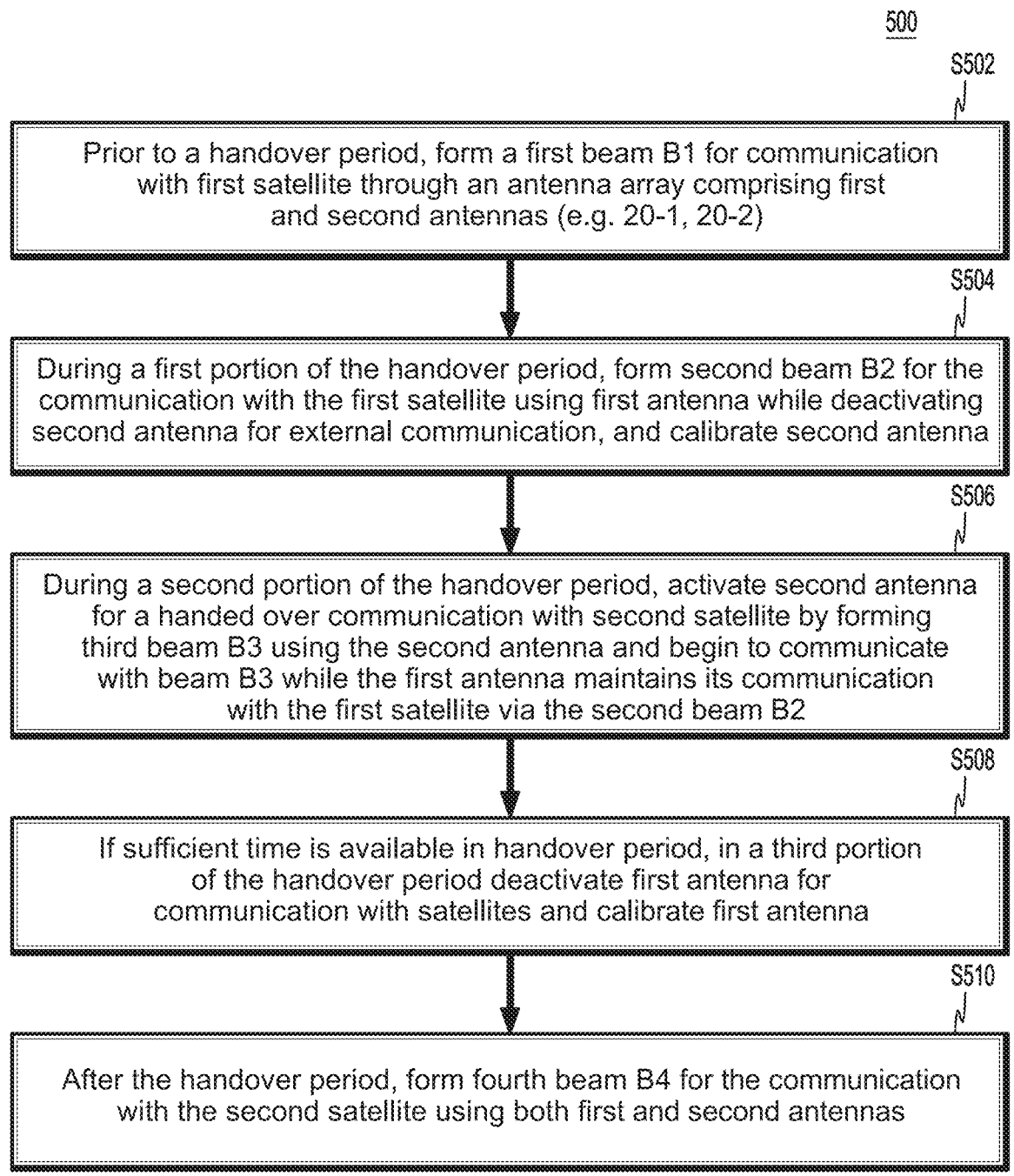
FIG. 5A is a flowchart of an example method of operating and calibrating the antenna system in the field.
Figure 5B:
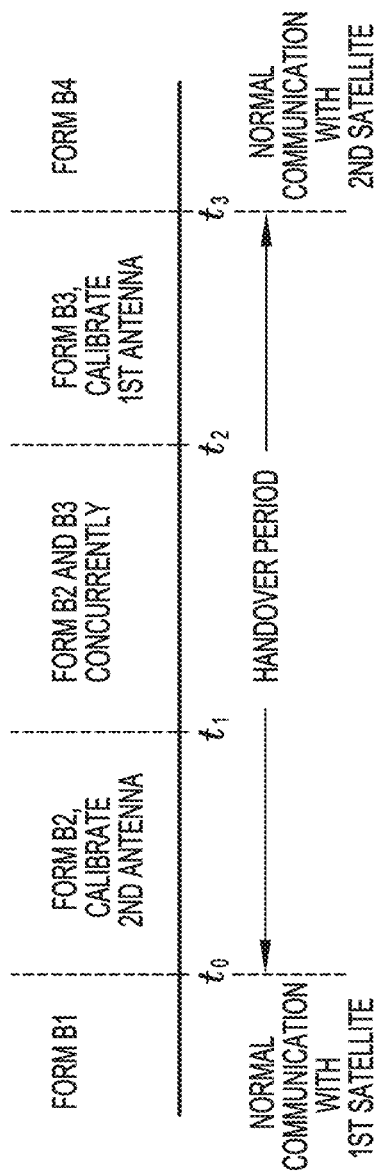
FIG. 5B is a timing diagram illustrating exemplary timing of beam forming and calibration operations during the example method.
Figure 6A:
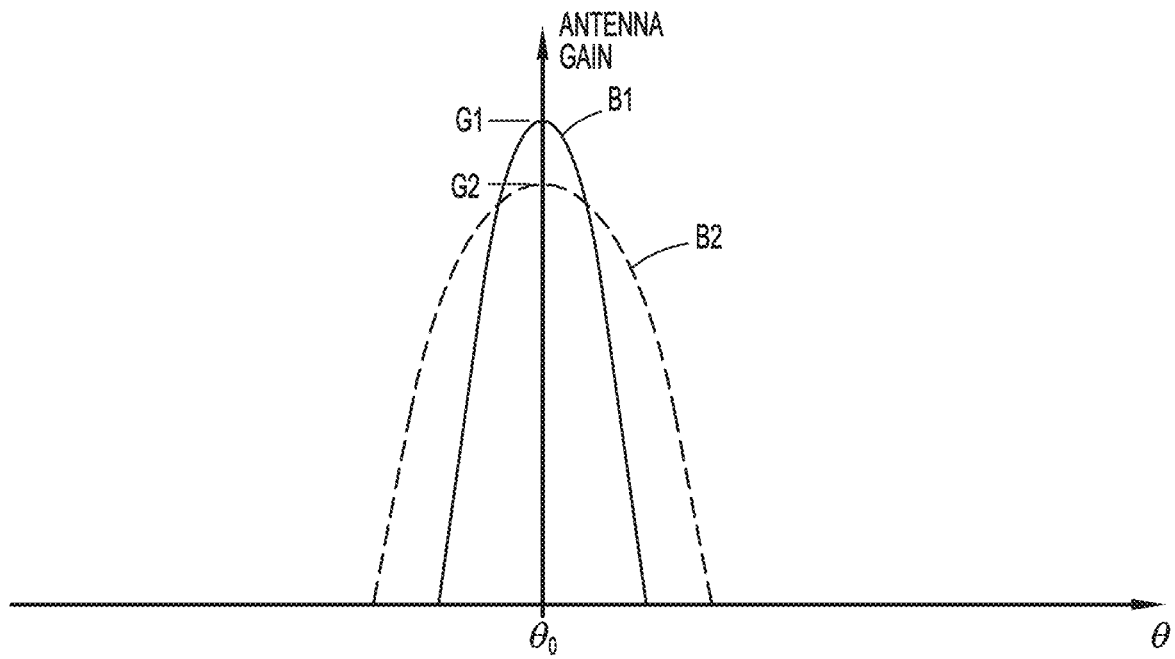
FIG. 6A depicts example first and second beams formed by the antenna system before and during a first portion of a handover period, respectively.
Figure 6B:
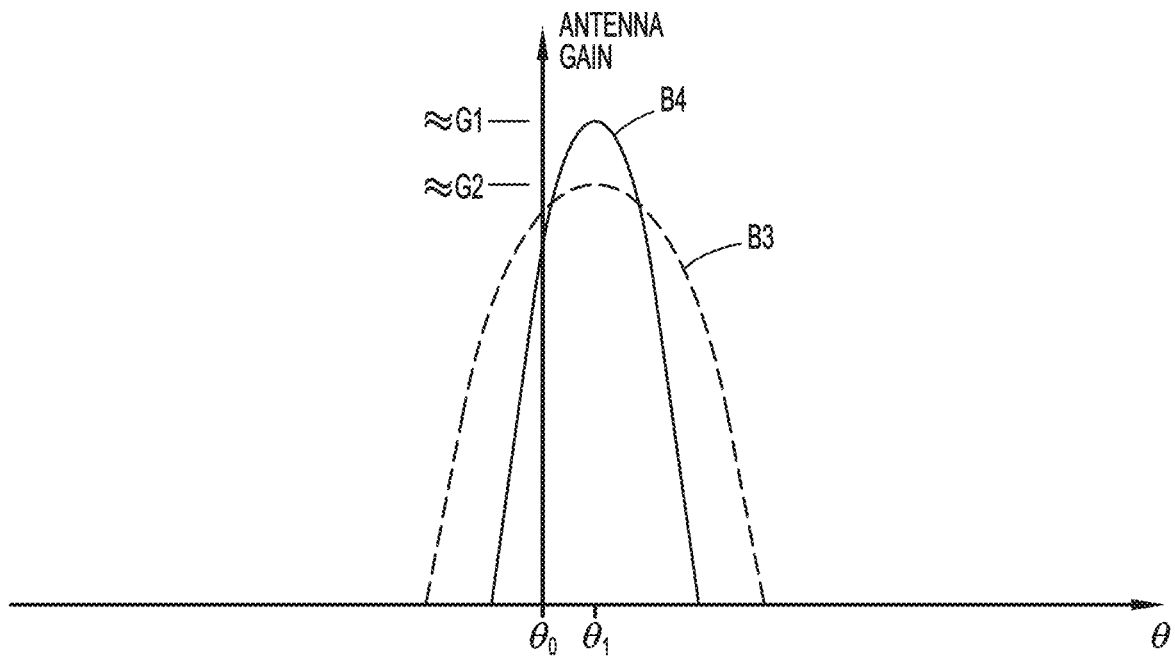
FIG. 6B depicts example third and fourth beams formed by the antenna system during and after a second portion of the handover period, respectively.

FIG. 5A is a flowchart of an example method 500 of operating and calibrating the antenna system 10 in the field. FIG. 5B is a timing diagram illustrating exemplary timing of beam forming and calibration operations during method 500. FIG. 6A illustrates example first and second beams that may be formed by antenna system 10 during a first portion of a handover period designated by method 500. FIG. 6B shows example third and fourth beams formed by antenna system 10 during and after a second portion of the handover period, respectively. Only the main beams (and not the sidelobes) are shown in FIGS. 6A-6B for simplicity, and while the antenna patterns thereof are illustrated in a single plane, the beams may be pencil beams with approximately equal characteristics in all planes.

Referring generally to FIGS. 1-6B, with method 500, prior to the handover period, a first beam B1 is formed (S502) for normal communication with first satellite 91 through antenna array 21. In this state, which occurs prior to a time t0 of FIG. 5B, controller 30 may turn on all the amplifiers within antennas 20-1 and 20-2 of antenna array 21 such that both antennas are fully activated for the communication. Thus, antenna array 21 has an effective aperture with 2N antenna elements spanning a two-dimensional plane combining the N antenna elements of each antenna 20-1, 20-2, and a first pencil beam B1 is thereby formed at a high gain G1. The phases of phase shifters 24 are controlled to produce either a uniform phase, or a phase gradient, if needed, across the effective aperture of antenna array 21. In this manner, the peak of first beam B1 points at a scan angle $\theta_0$ as seen in FIG. 6A, towards satellite 91. The scan angle $\theta_0$ is an angle with respect to a predetermined reference axis, e.g., a normal to the planar surface F of antenna array 21.

When a handover for handing over the communication with antenna system 10 from first satellite 91 to second satellite 92 is imminent, a handover period beginning at time t0 is set up by controller 30 or an external system. During a first portion of the handover period (operations S504) from time t0 to time t1, a second beam B2 is formed for communication with first satellite 91 using first antenna 20-1 without any contribution from second antenna 20-2. To form second beam B2, controller 30 deactivates second antenna 20-2 for external communication by turning off all its amplifiers (except one at a time may be turned on during a calibration procedure as explained earlier). With antenna 20-2 thus deactivated, a calibration procedure is performed between times t0 and t1 using calibration circuit 50 as described above. Since second beam B2 is formed with just the antenna elements of antenna 20-1, the effective aperture of antenna array 21 is reduced by half, and the resultant beam B2 is wider than beam B2 and has a lower gain G2.

During a second portion of the handover period (operations S506) from time t1 to time t2, beam B2 continues to be formed by antenna 20-1 for communication with first satellite 91, while second antenna 20-2 is re-activated for communication with second satellite 92 to initiate a seamless handover of the communication from first satellite 91 to second satellite 92. When second antenna 20-2 is re-activated, it forms a third beam B3 which has approximately the same gain G2 as the second beam B2. Thus, during this time period, antennas 20-1 and 20-2 are operated independently and transmit/receive independent signals. For instance, antenna 20-2 communicates with second satellite 92 with signals at different frequencies and/or protocols than those used by satellite 92, whereby interference in each communication is minimized. If second satellite 92 is located in a different direction with respect to the reference axis of antenna array 21, third beam B3 is formed pointing in the different direction of second satellite 92. This scenario is depicted in FIG. 6B, which shows the peak of third beam B3 pointing at a scan angle $\theta_1$, which is offset from angle $\theta_0$ and may correspond to a line of sight direction to second satellite 92. To re-point third beam B3 to scan angle $\theta_1$, controller 30 applies control signals to phase shifters 24 of antenna 20-2 to set their phases so that a phase gradient is generated across its effective aperture. Additionally, amplitudes of the signal paths connected to each antenna element 22 may be individually controlled to fine tune the beam characteristics, by controlling the gains of the LNAs and PAs and the losses of the variable attenuators. The process of setting phases and adjusting amplitudes in this manner may be referred to as adjusting the beam weights of the antenna elements 22.

If sufficient time is still available in the handover period according to predefined operating requirements, a third portion of the handover period, between time t2 and time t3 in FIG. 5B, may be allocated for operations S508. During this period, first antenna 20-1 is deactivated for any external communication by turning OFF all its amplifiers (except one or more amplifiers connected to an antenna element 22 to be initially calibrated). This deactivation terminates the communication with first satellite 91. Meanwhile, second antenna 20-2 continues to communicate with second satellite 92. While first antenna 20-1 is deactivated, an analogous calibration procedure as was used to calibrate second antenna 20-2 during the first portion of the handover period is used to calibrate first antenna 20-1.

On the other hand, if insufficient time remains in the handover period for completing calibration of all signal paths to all of the antenna elements 22 within antenna array 21, the calibration of the remaining antenna elements 22 may be performed during the next handover period.

After the handover period (subsequent to time t3 in FIG. 5B), a fourth beam B4 is formed for the communication with second satellite 92 using both first and second antennas 20-1, 20-2 (S510). To form fourth beam B4, the phase shifters 24 of antenna 20-1 may be controlled to form the same phase gradient as for second antenna 20-2, whereby fourth beam B4 is formed as shown in FIG. 6B to point at angle $\theta_1$ and to have about the same gain G1 as the first beam B1.

Figure 7A:
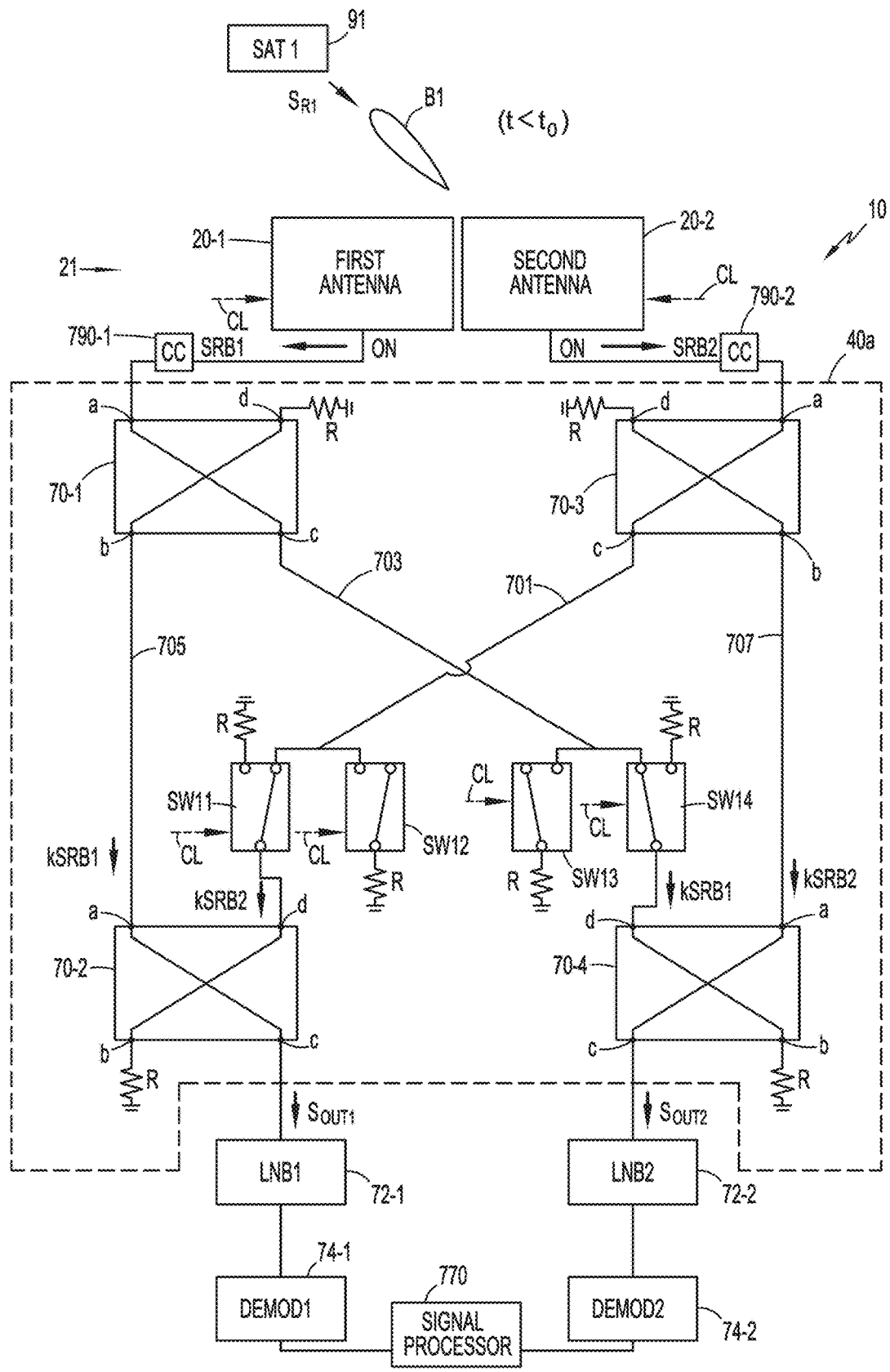
FIG. 7A illustrates an example cross-coupled switch in the antenna system and an exemplary operational state of the antenna system just prior to a handover period.

FIG. 7A illustrates a functional block diagram of a receive cross-coupled (RCC) switch 40a, shown in relation to other components of antenna system 10. RCC switch 40a is an embodiment of RCC switch 40 described above. FIG. 7A also illustrates a state of antenna system 10 during a normal communication with first satellite 91, e.g., prior to time t0 of FIG. 5B. Cross-coupled switch 40a includes first, second, third and fourth 3 dB hybrid couplers 70-1, 70-2, 70-3 and 70-4; single pole, double throw (SPDT) switches SW11, SW12, SW13 and SW14; cross-coupled signal lines 701 and 703; and straight-path signal lines 705 and 707, a plurality of terminations R connected to various ports of the couplers 70 and switches SW11-SW14. Other shown exemplary components of antenna system 10 include antenna array 21, calibration chains (CC) 790-1 and 790-2; first and second low noise blocks (LNBs) 72-1, 72-2; first and second demodulators 74-1, 74-2; and signal processor 770. The switching states of switches SW11-SW14 are controlled by controller 30 (not shown in FIG. 7A) via control signals on control lines CL. Calibration chain 790-1 includes T/R element 18-1, coupler 60-1, VDL 65-1 and switch SW3 as shown in FIG. 1A. CC 790-2 includes T/R element 18-2, coupler 60-2, VDL 65-2 and switch SW4.

For each 3 dB hybrid coupler 70, a signal applied to any port a, b, c or d is equally divided but quadrature phase shifted among the opposite facing output ports. Thus, a signal applied to port "a" is equally divided into a signal at port b and a signal at port c that lags the signal at port b by 90°, but reflected power at ports b and c mostly appears at port d, and is terminated there is a termination R is connected. Other types of 3 dB couplers, such as hybrid ring ("rat race") couplers or Wilkinson power dividers, may be substituted in other embodiments.

During the normal communication with satellite 91, all the amplifiers of first and second antennas 20-1, 20-2 may be turned ON, and switching states of switches SW11-SW14 are controlled to cross-couple first and second receive beam signals SRB1 and SRB2 output by first and second antennas 20-1 and 20-2, respectively. By phase balancing the two halves of RCC switch 40a and the two signal paths connecting first and second antennas 20-1, 20-2 to RCC switch 40a, substantially of the receive signal energy appears as equal amplitude, phase balanced signals $S_{OUT1}$ and $S_{OUT2}$. The electrical lengths of signal lines 705, 703, 701 and 707, as well as the electrical lengths in the couplers 70-1 to 70-4 and switches SW11-SW14 may all have been precisely calibrated during the manufacture and initial set-up of antenna system 10. For instance, a first electrical length of a signal path from port "a" of coupler 70-1 to port "a" of coupler 70-2 may have been set equal to a second electrical length of a signal path from port "a" of coupler 70-3 to port "a" of coupler 70-4. However, the electrical length from port a of coupler 70-3 to port d of coupler 70-2 may have been set to "phase lead" the first electrical length by 90°. In this manner, the signal energy of two input signals, kSRB1 and kSRB2 (where k=0.5) appearing at ports "a" and d of coupler 70-2 may constructively add, such that substantially all the signal energy of these signals appears at port c of coupler 70-2 as signal $S_{OUT1}$. An analogous constructive addition of signal energy is applicable at coupler 70-4 to generate output signal $S_{OUT2}$. Accordingly, beam B1 is formed for normal communication with first satellite 91. An analogous configuration for transmit cross-coupler 41 can be implemented to generate substantially the same antenna pattern for beam B1 on transmit.

Figure 7B:
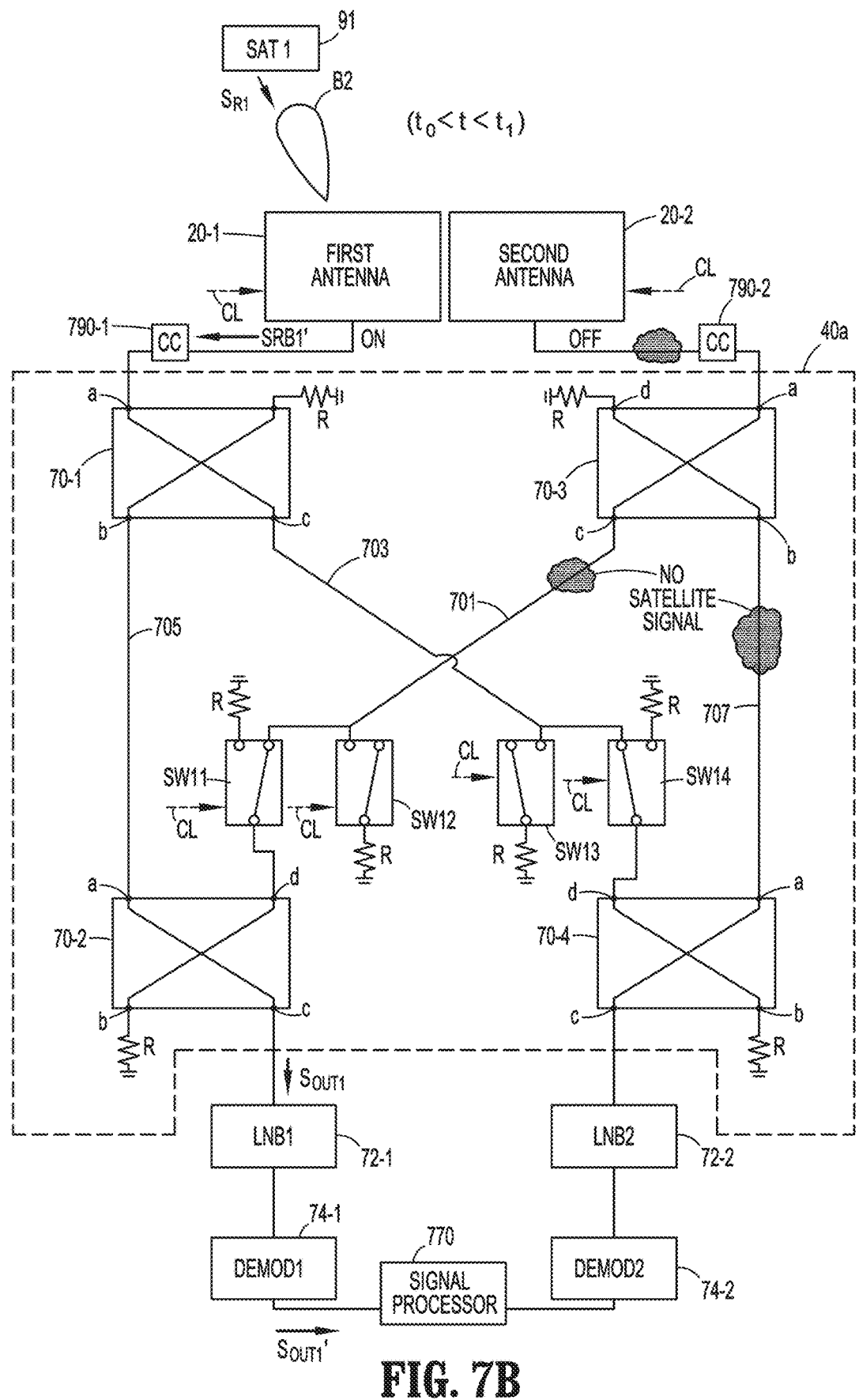
FIG. 7B illustrates an operational state of the antenna system with the example cross-coupled switch during a first portion of a handover period, in which a second antenna of the antenna system is deactivated for external communication.

FIG. 7B illustrates an operation state of antenna system 10 with receive cross-coupled switch 40a during the above-described first portion of the handover period between times t0 and t1 of FIG. 5B. In this state, the second antenna 20-2 is deactivated by turning OFF all its amplifiers (LNAs and PAs). (Such turning OFF of the amplifiers may have been implemented in a ramping down fashion.) Hence, no satellite signal is transmitted/received on lines 701 and 707. Accordingly, first antenna 20-1 generates second beam B2 without any contribution from first antenna 20-2. Demodulator 74-1 demodulates output signal $S_{OUT1}$ to provide a demodulated signal $S_{OUT1}'$. The two halves of RCC switch 40a may remain cross-coupled through signal lines 701 and 703 by maintaining the previous switching states of switches SW11-SW14 as illustrated.

Figure 7C:
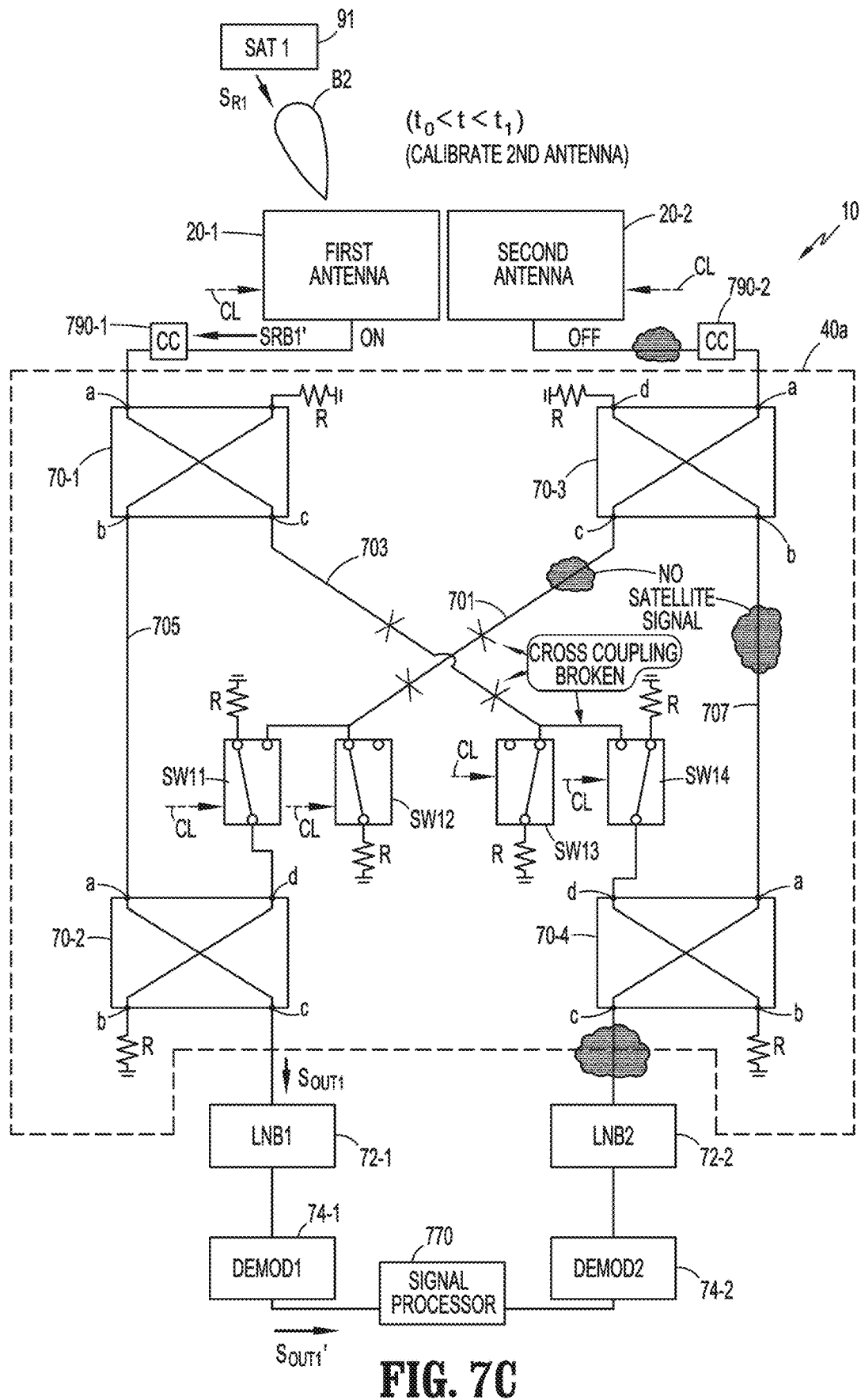
FIG. 7C illustrates an operational state of the antenna system with the example cross-coupled switch during the first portion of a handover period, in which cross-coupling within the switch is broken and the second antenna is calibrated.

FIG. 7C illustrates an operation state of antenna system 10 with RCC switch 40a during the first portion of the handover period, subsequent to the time of the operational state of FIG. 7B. In the state of FIG. 7C, all the amplifiers within second antenna 20-2 remain turned OFF and the cross-coupling within RCC switch 40a is broken by swapping the switching positions in each of switches SW11-SW14, as illustrated. With the cross-coupling broken, second antenna 20-2 may be calibrated in the manner described above while first antenna 20-2 continues to communicate with first satellite 91 by forming second beam B2.

Figure 7D:
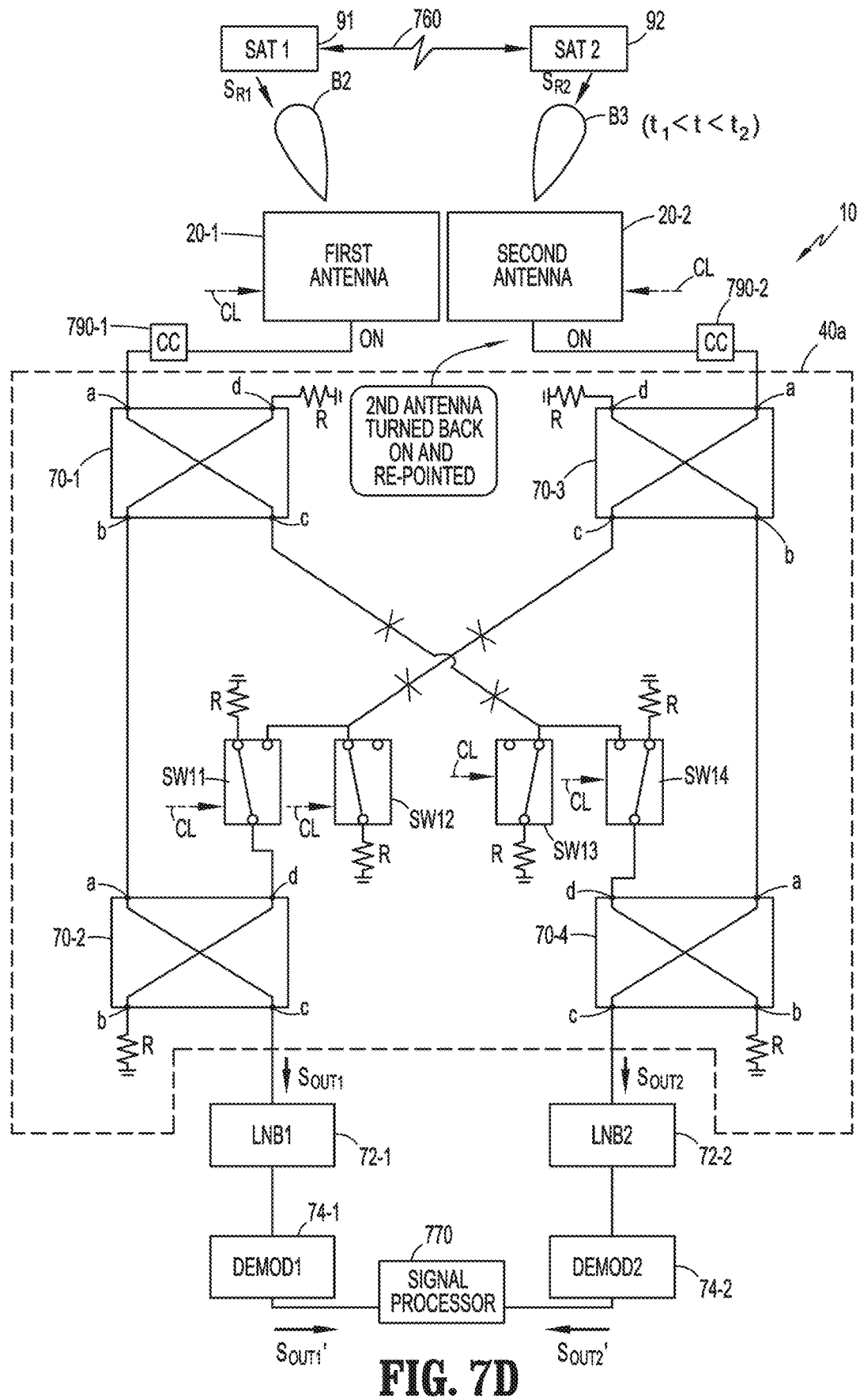
FIG. 7D illustrates an operational state of the antenna system with the example cross-coupled switch during a second portion of a handover period, in which first and second antennas of the antenna system communicate with first and second satellites, respectively.

FIG. 7D illustrates an operation state of antenna system 10 with RCC switch 40a during the second portion of a handover period, between times t1 and t2 discussed above. In this state, the amplifiers within second antenna 20-2 are turned back ON such that second antenna 20-2 is re-activated. In addition, controller 30 adjusts the phases of the phase shifters within second antenna 20-2 to cause it to form third beam B3 with its main lobe pointing at satellite 92. Meanwhile, the cross-coupling in RCC switch 40a remains broken, such that first and second antennas 20-1 and 20-2 individually communicate with first and second satellites 91 and 92, respectively. Accordingly, first demodulator 74-1 outputs a first demodulated signal $S_{OUT1}'$ to signal processor 770, representing a demodulated receive signal from satellite 91, and second demodulator 74-2 outputs a second demodulated signal $S_{OUT2}'$ representing a demodulated receive signal from satellite 92.

Figure 7E:
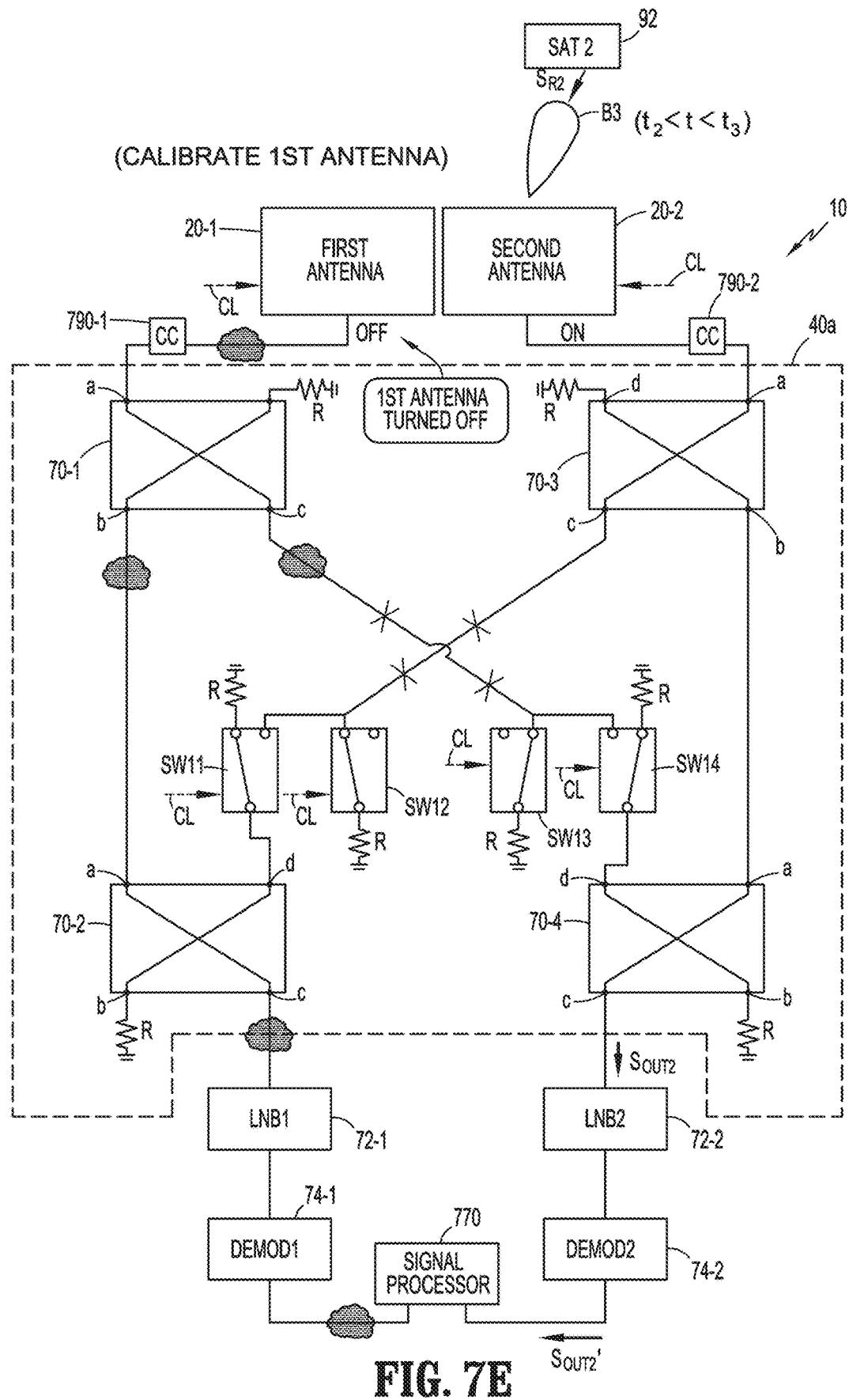
FIG. 7E illustrates an operational state of the antenna system with the example cross-coupled switch during a third portion of a handover period, in which the first antenna of the antenna system is calibrated.

FIG. 7E illustrates an operation state of antenna system 10 with RCC switch 40a during the third portion of the handover period, between times t2 and t3 of FIG. 5B. In this state, first antenna 20-1 is deactivated by having its amplifiers turned OFF, thereby ceasing the communication with first satellite 91. Meanwhile, the cross-coupling state of RCC switch 40a remains disconnected and second antenna 20-2 continues to form beam B3 for communication with second satellite 92. As a result, the demodulated output signal to signal processor 770 is just signal $S_{OUT2}'$ output by second demodulator 74-2, which is derived from the receive signal $S_{R2}$ of the second satellite 92. Thus, the handover of the communication session with antenna system 10 is effectively handed over to second satellite 92. In this state, the above-described calibration of first antenna 20-1 may be performed, if time is still available in a requisite handover period.

Figure 7F:
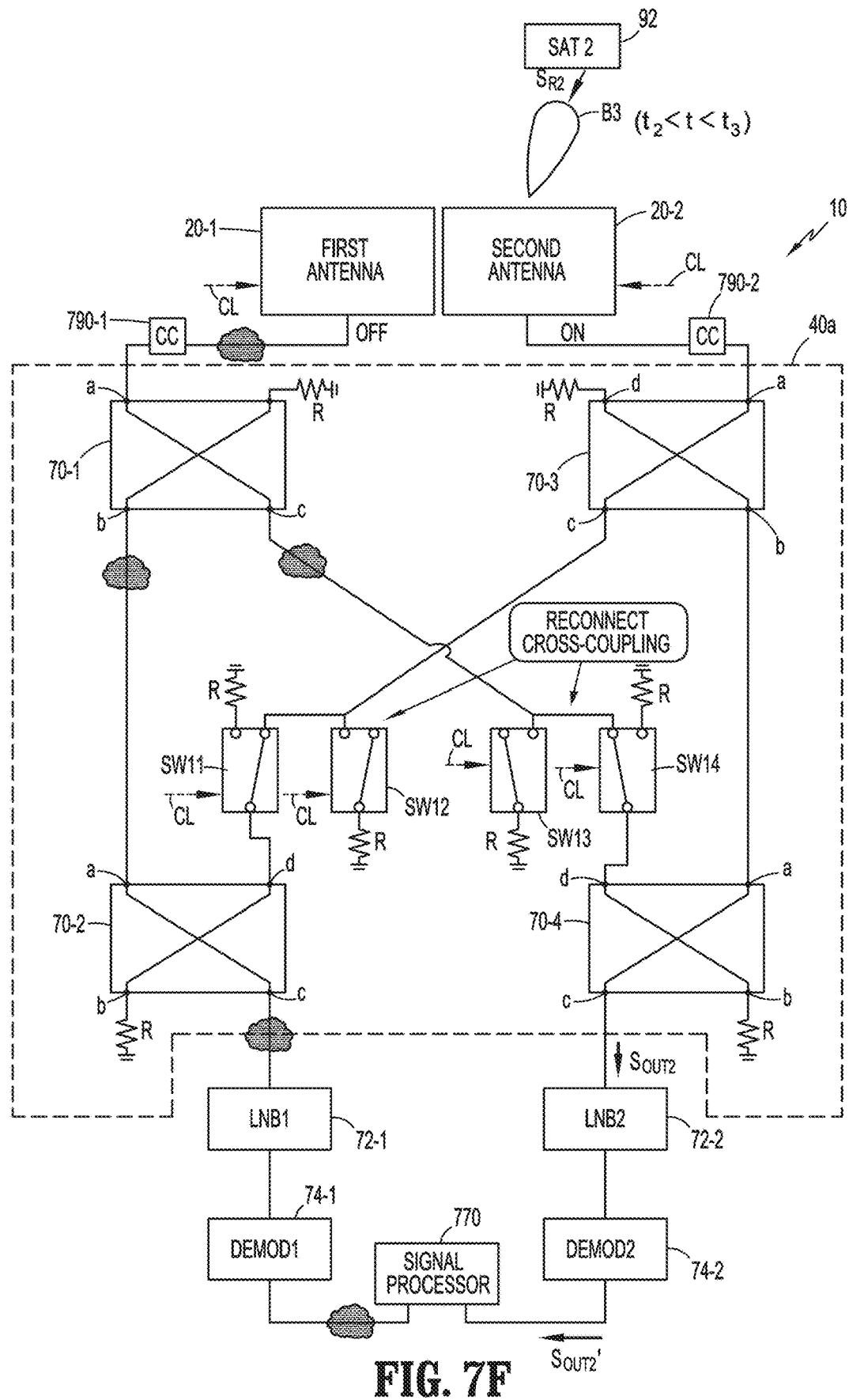
FIG. 7F illustrates an operational state of the antenna system with the example cross-coupled switch during the third portion of the handover period, in which cross-coupling of the switch is re-connected.

FIG. 7F illustrates an operation state of antenna system 10 with RCC switch 40a during the third portion of the handover period, following the calibration of first antenna 20-1 as in FIG. 7E. FIG. 7F shows that the cross-coupling of RCC switch 40a is reconnected by changing the switching states of switches SW11-SW14. This occurs while first antenna 20-1 remains deactivated and second antenna is in communication with satellite 92 by forming beam B3.

Figure 7G:
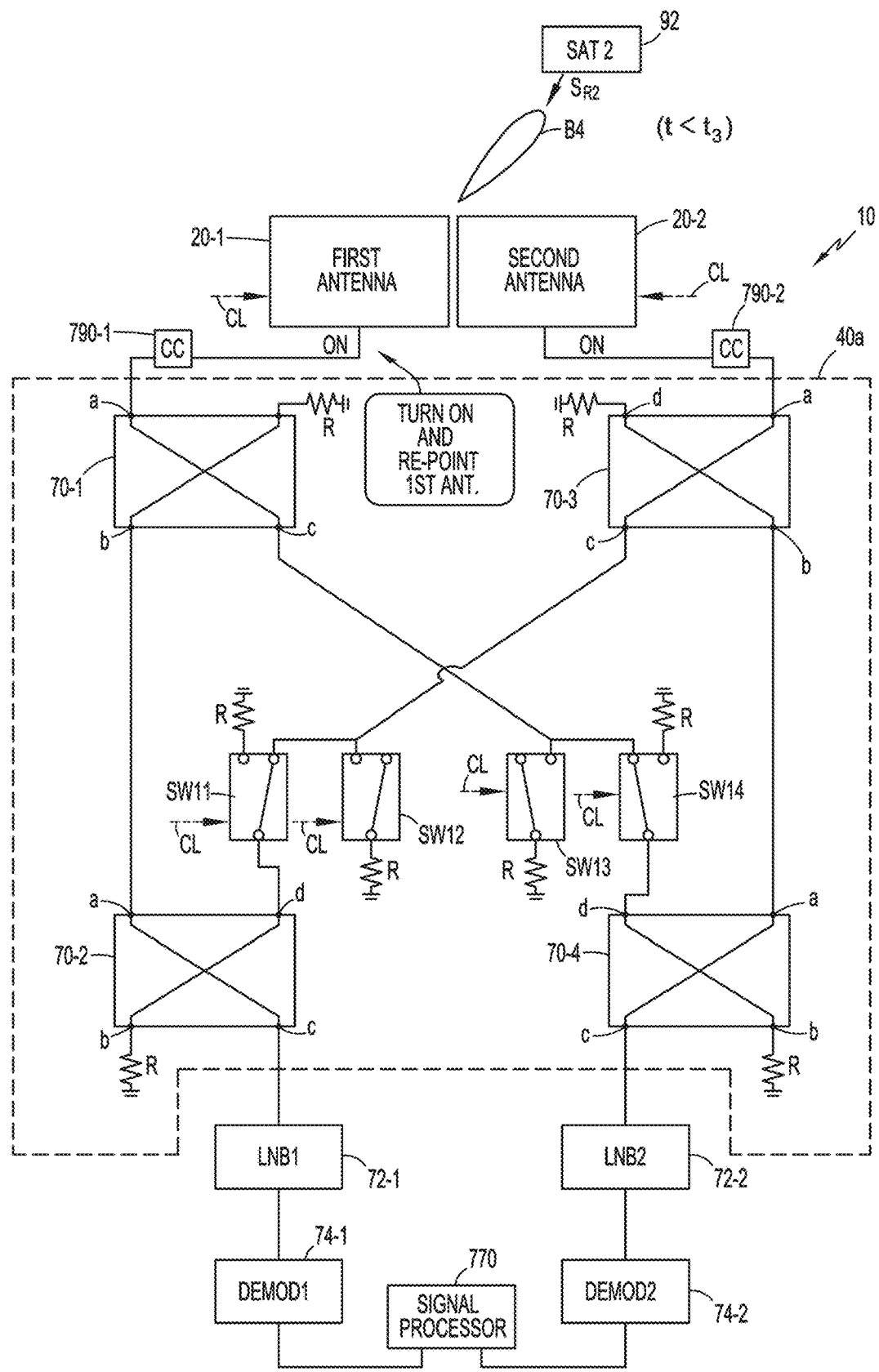
FIG. 7G illustrates an operational state of the antenna system with the example cross-coupled switch just after the handover period.

FIG. 7G illustrates an exemplary operational state of antenna system 10 with RCC switch 40a just after the handover period. In this state, first antenna 20-1 is reactivated and its phase shifters 24 have been adjusted to continue the phase gradient of second antenna 20-2 across the effective aperture of first antenna 20-1, such that the resulting beam B4 continues to point towards second satellite 92 and a normal communication operation is again performed.

Figure 8:
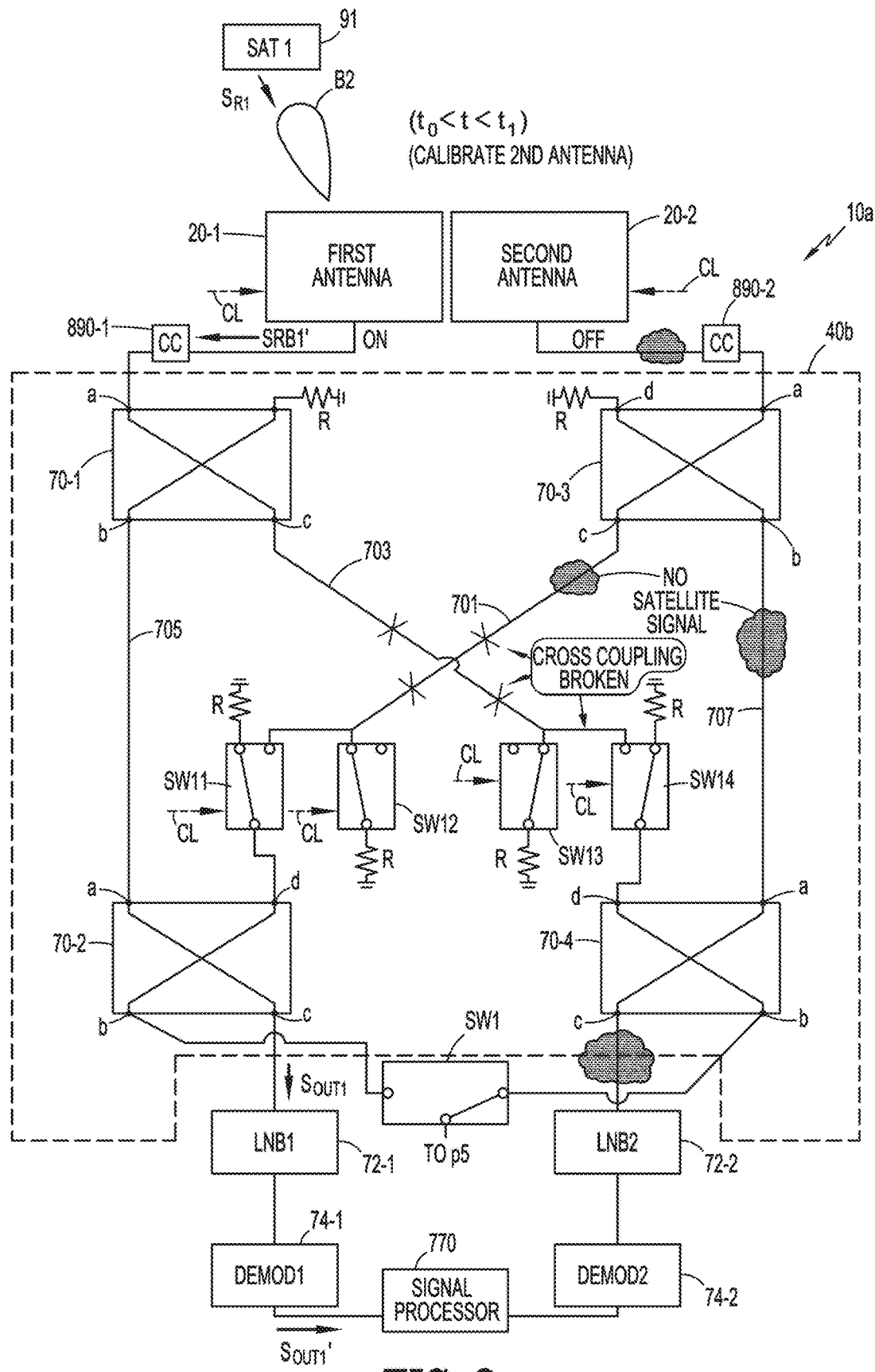
FIG. 8 illustrates an alternative embodiment of an antenna system according to the disclosed technology.

FIG. 8 schematically illustrates an alternative embodiment of an antenna system including field-calibration circuitry. Antenna system 10a differs from antenna system 10 by providing means for including the cross-coupled switches in the calibration paths. Thus, antenna system 10a omits SPDT switches SW3, SW3', SW4 and SW4' of FIGS. 1A-1B (and thus calibration chains 890-1 and 890-2 differ from chains 790 accordingly). Receiving cross-coupled (RCC) switch 40b differs from RCC switch 40a by connecting ports b of couplers 70-2 and 70-4 to different input ports of switch SW1, and omitting the terminations. An analogous connection is made in a transmitting cross-coupled switch (not shown). Accordingly, calibration paths on receive include paths within RCC switch 40b and calibration paths on transmit would include analogous calibration paths in a transmitting cross-coupled switch.

Accordingly, antenna system 10a includes single pole multi-throw (SPMT) switch SW1 having an output port coupled to the input port p5 of calibration circuit 50, and having a plurality of input ports. An output port of coupler 70-2 is coupled to a first input port of SPMT switch SW1, and an output port of the coupler 70-4 is coupled to a second input port of the switch SW1; and controller 30 controls the switch SW1 to close a first switching path between the first input port and the output port thereof to calibrate the first antenna 20-1, and to close a second switching path between the first input port and the output port thereof to calibrate the second antenna 20-2 on receive. Analogous operations are implemented for calibrating the transmit paths.

As used herein, a "controller" is a device that may include a processor and a memory. A controller may be embodied with processing circuitry, which may be in the form of a general or specific-purpose processor, a digital signal processor (DSP), an application specific integrated circuit (ASIC), a field programmable gate array (FPGA) or other programmable logic device, discrete gate or transistor logic, discrete hardware components, or any combination thereof to perform its operations described herein. For instance, controller 30 or controller 55 may read and execute instructions read from a memory therein to perform its operations. The memory can be any suitable non-transitory computer-readable storage medium. The term "processor" as used herein is intended to include any processing device, such as, for example, one that includes a central processing unit (CPU) and/or other processing circuitry. Moreover, a "processor" includes computational hardware and may refer to a multi-core processor that contains multiple processing cores in a computing device. Various elements associated with a processing device may be shared by other processing devices.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A method of calibrating an antenna system comprising an antenna array of at least first and second antennas with a calibration circuit, the method comprising:
generating an output test signal at a signal source;
during a receive path calibration:
routing, via a first switch, the output test signal from the signal source to a first test path port;
routing, via a second switch, a return test signal from a second test path port to a receiver;
generating a receive test path measurement based on the output test signal and the return test signal; and
outputting the receive test path measurement to a controller via an input/output (I/O) interface;
during a transmit path calibration:
routing, via the second switch, the output test signal from the signal source to the second test path port;
routing, via the first switch, the return test signal from the first test path port to the receiver;
generating a transmit test path measurement based on the output test signal and the return test signal; and
outputting the transmit test path measurement to the controller via the I/O interface.

2. The method of claim 1, wherein the signal source comprises a first local oscillator (LO), a power divider, and a second LO.

3. The method of claim 2, wherein the second LO is a lower noise generating LO than the first LO.

4. The method of claim 2, wherein the receiver includes a power divider, a peak detector, a downconverter, and a phase detector.

5. The method of claim 4, wherein the calibration controller comprises first and second analog to digital converters (ADCs) and a digital signal analyzer.

6. The method of claim 5, wherein, for either the receive path calibration or the transmit path calibration, the first LO generates a low frequency signal and the power divider splits the low frequency signal into first and second divided LO signals, wherein an upconverter upconverts the first divided LO signal based on a second LO signal generated by the second LO, and wherein the output test signal comprises the upconverted signal.

7. The method of claim 6, wherein the power divider divides the return test signal into a first divided return signal and a second divided return signal, wherein the first divided return signal is applied to the peak detector and the second divided return signal is applied to the downconverter, wherein the peak detector detects peak amplitudes of the first divided return signal and outputs an envelope signal to the ADC, wherein the ADC generates digital samples of the envelope signal.

8. The method of claim 7, wherein the digital signal analyzer analyzes the digital samples and generates first and second amplitude result signals, wherein the first amplitude result signal represents a mean of the digital samples and the second amplitude result signal represents a standard deviation of the digital samples indicative of amplitude noise.

9. The method of claim 8, wherein the first and second amplitude result signals are output to the controller via the I/O interface as the receive test path measurement for the receive path calibration or transmit test path measurement for the transmit path calibration.

10. The method of claim 1, wherein the calibration circuit calibrates the second antenna with the method during a first portion of a handover period while the second antenna is deactivated for external communication and wherein a test path is between a radiating element and an antenna element of the second antenna.

11. A calibration circuit for an antenna system having an antenna array, the calibration circuit comprising:
an input/output (I/O) interface configured to communicate between the calibration circuit and a controller of the antenna system;
a first switch and a second switch;
a signal source configured to generate an output test signal;
a receiver configured to receive a return test signal;
a first test path port and a second test path port configured to couple the calibration circuit into a test path of the antenna system; and
a calibration controller configured to:
during a receive path calibration:
control the first switch to route the output test signal from the signal source to the first test path port; and
control the second switch to route the return test signal from the second test path port to the receiver; and
during a transmit path calibration:
control the second switch to route the output test signal from the signal source to the second test path port; and
control the first switch to route the return test signal from the first test path port to the receiver,
wherein at least one of the receiver and the calibration controller generates a receive test path measurement based on the output test signal and the return test signal during the receive path calibration and output the receive test path measurement to the controller via the I/O interface, and
wherein at least one of the receiver and the calibration controller generates a transmit test path measurement based on the output test signal and the return test signal during the transmit path calibration and output the transmit test path measurement to the controller via the I/O interface.

12. The calibration circuit of claim 11, wherein the signal source comprises a first local oscillator (LO), a power divider, and a second LO.

13. The calibration circuit of claim 12, wherein the second LO is a lower noise generating LO than the first LO.

14. The calibration circuit of claim 12, wherein the receiver includes a power divider, a peak detector, a downconverter, and a phase detector.

15. The calibration circuit of claim 14, wherein the calibration controller comprises first and second analog to digital converters (ADCs) and a digital signal analyzer.

16. The calibration circuit of claim 15, wherein, for either the receive path calibration or the transmit path calibration, the first LO generates a low frequency signal and the power divider splits the low frequency signal into first and second divided LO signals, wherein an upconverter upconverts the first divided LO signal based on a second LO signal generated by the second LO, and wherein the output test signal comprises the upconverted signal.

17. The calibration circuit of claim 16, wherein the power divider divides the return test signal into a first divided return signal and a second divided return signal, wherein the first divided return signal is applied to the peak detector and the second divided return signal is applied to the downconverter, wherein the peak detector detects peak amplitudes of the first divided return signal and outputs an envelope signal to the ADC, wherein the ADC generates digital samples of the envelope signal.

18. The calibration circuit of claim 17, wherein the digital signal analyzer analyzes the digital samples and generates first and second amplitude result signals, wherein the first amplitude result signal represents a mean of the digital samples and the second amplitude result signal represents a standard deviation of the digital samples indicative of amplitude noise.

19. The calibration circuit of claim 18, wherein the first and second amplitude result signals are output to the controller via the I/O interface as the receive test path measurement for the receive path calibration or transmit test path measurement for the transmit path calibration.

20. The calibration circuit of claim 11, wherein the controller commands calibration of the second antenna during a first portion of a handover period while the second antenna is deactivated for external communication and wherein a test path is between a radiating element and an antenna element of the second antenna.

* * * * *